United States Patent [19]
Rhodes

[11] Patent Number: 5,770,999
[45] Date of Patent: *Jun. 23, 1998

[54] VEHICLE LIGHT CONTROL SYSTEM

[76] Inventor: Michael E. Rhodes, Rte. 3, Box 930, Big Fork, Minn. 56628

[ * ] Notice: The term of this patent shall not extend beyond the expiration date of Pat. No. 5,644,290.

[21] Appl. No.: 886,530

[22] Filed: Jul. 1, 1997

Related U.S. Application Data

[63] Continuation-in-part of Ser. No. 498,433, Jul. 5, 1995, Pat. No. 5,644,290, which is a continuation-in-part of Ser. No. 77,094, Jun. 16, 1993, Pat. No. 5,434,553.

[51] Int. Cl.$^6$ ..................................................... B60Q 1/00
[52] U.S. Cl. .......................... 340/468; 342/463; 342/471; 342/472; 342/479; 307/10.8
[58] Field of Search .................................... 340/463, 468, 340/471, 472, 479; 307/10.8

[56] References Cited

U.S. PATENT DOCUMENTS

| | | | |
|---|---|---|---|
| 4,037,195 | 7/1977 | Wojslawowicz | 340/471 |
| 4,249,160 | 2/1981 | Chilvers | 340/471 |
| 4,678,925 | 7/1987 | Grocke | 307/10.8 |
| 4,812,808 | 3/1989 | Ulrich | 340/471 |
| 4,939,503 | 7/1990 | Swanson | 340/431 |
| 5,081,565 | 1/1992 | Nabha et al. | 307/10.8 |
| 5,434,553 | 7/1995 | Rhodes | 340/468 |
| 5,644,290 | 7/1997 | Rhodes | 340/468 |

*Primary Examiner*—Edward Lefkowitz
*Attorney, Agent, or Firm*—Richard C. Litman

[57] ABSTRACT

An improved blackout control system located within the passenger compartment allows the driver to alter the normal and emergency lighting features of the vehicle. The blackout control system comprises an illuminated control panel unit modified by harness and control units which are attached to the lighting system of a conventional emergency vehicle. A four-position three-level emergency "Red" switch is provided as an improvement on the control panel. A second blackout reset switch is provided to restore power to the blackout switches. A third blackout switch is provided on the panel which disables the brake and backup lights of the vehicle. A fourth switch for blacking out the tail lights, parking and/or corner lights is provided. A fifth blackout switch is provided to disable headlight daytime running lights. A sixth high beam sneak light switch is provided to activate a high beam sneak light mounted on the front of the vehicle with less lighting than the driving lights. A seventh low beam sneak light is provided with a hooded sneak light located in front of the vehicle which may be used to provide less lighting in front of the vehicle than the normal horizontally disposed headlights.

29 Claims, 12 Drawing Sheets

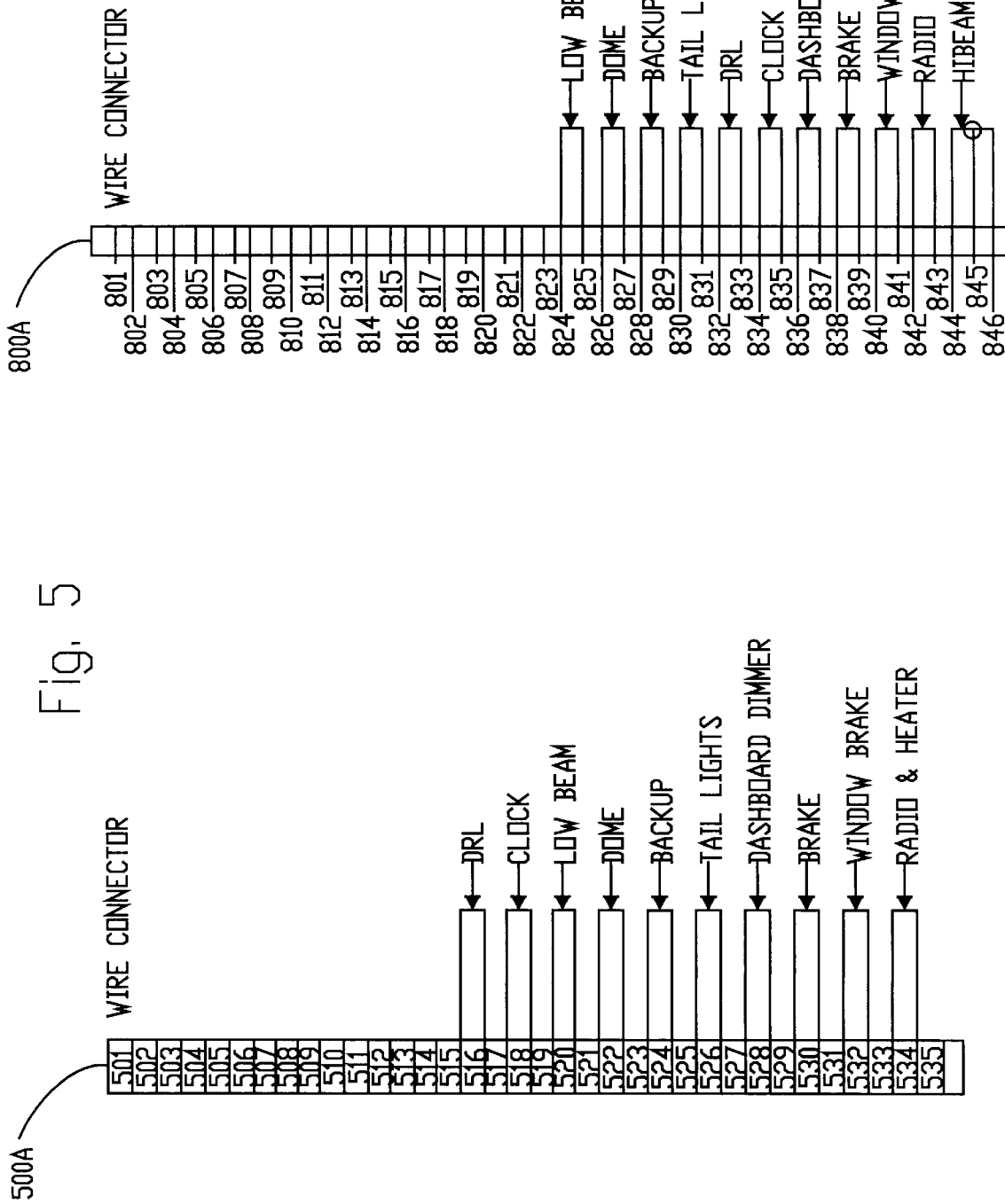

VEHICLE LIGHT CONTROL SYSTEM

This application is a continuation-in-part of application Ser. No. 08/498,433, filed Jul. 5, 1995, now U.S. Pat. No. 5,644,290, which is a continuation-in-part of application Ser. No. 08/077,094, filed Jun. 16, 1993, now U.S. Pat. No. 5,434,553.

BACKGROUND OF THE INVENTION

1. Field of the Invention

The present invention relates to an improved blackout control system for lighting control systems installed within an emergency or police vehicle for altering the control of the lighting features of the vehicle. The blackout control system comprises an improved control panel unit, a harness unit and a control unit. The improved blackout control system of the present invention pertains to those lighting control systems installed within emergency or police vehicles for blacking out selectively one or more of the following vehicle lighting devices: one or both headlights, daytime running lights, interior dome light, interior clock, brake lights, tail lights, back-up lights, dashboard lights, and the control panel lights to render the vehicle less visible to those outside the vehicle. Bypass plug-in units are provided for the convenience of bypassing the improved blackout control system in the event servicing of different control systems is required or if a return to the original lighting system is desired without expensive removal of the blackout control system. Police vehicles include automobiles, snowmobiles, all terrain vehicles (ATV), ski jets, boats and the like.

2. Description of the Prior Art

Lighting control devices for altering the conventional lighting features of a vehicle are located between the switching arrangements of the vehicle, such as the running lights switch, the high beam switch, etc., and the lights under their control. These devices allow for special lighting features to be added to the conventional lighting features of the vehicle. Some of the devices allow for an override of the special lighting features to allow the lighting features to operate in the conventional manner when desired by the user.

U.S. Pat. No. 4,037,195 issued Jul. 19, 1977, to Jack Edward Wojslawowicz describes a vehicular signal light control system which includes silicon-controlled-rectifiers of the gate-turn-off type to selectively control the current to the running lights.

U.S. Pat. No. 4,249,160 issued Feb. 3, 1981, to Graham R. Chilvers describes a vehicle mounted light activated control system for operating warning lights which includes a light sensor and a comparator. The comparator then triggers a time delay threshold device which switches on the warning lights for ten seconds, and only when the sensed light intensity of an approaching vehicle exceeds a threshold.

U.S. Pat. No. 4,678,925 issued Jul. 7, 1987, to Diethelm Grocke describes a dashboard lighting switch and switch lever for a motor vehicle.

U.S. Pat. No. 4,812,808 issued Mar. 14, 1989, to Larry F. Ulrich describes an electronic control circuit for controlling vehicle lights. An electronic circuitry board which has emergency circuitry to include tail lights with brake lights, front running lights, turn indicator lights with a switch, an emergency switch, and a brake light switch.

U.S. Pat. No. 4,939,503 issued Jul. 3, 1990, to Carl S. Swanson describes a wiring device system for a towed vehicle which couples the signal lights of both vehicles.

U.S. Pat. No. 5,081,565 issued Jan. 14, 1992, to Ali M. Nabha et al., describes a daytime running light system for a vehicle by employing level sensing comparators to effect reduced illumination of the high beam headlamps.

None of the above inventions and patents, taken either singly or in combination, is seen to describe the instant invention as claimed.

SUMMARY OF THE INVENTION

The device of the present invention provides for an improved blackout switch panel for a blackout control system having a wiring harness insertable within an emergency or police vehicle. The wiring harness is inserted within the already existing wiring arrangement of the vehicle controlling the various lighting features of the vehicle. Attachable to the wiring harness is a control unit which, under the control of the inventive switching panel located within easy reach of the driver, may interrupt certain lighting features of the vehicle.

Bypass plug-in units are provided for the convenience of bypassing the two improved blackout control systems in the event servicing of the control system is required or if a return to the original lighting system is desired without expensive removal of the blackout control system.

More particularly, certain lighting features are extinguished in order to render the vehicle or its operations less evident to others outside the vehicle, and inside the vehicle to eliminate glare in an officer's eyes from the radio and heater control lights on the dashboard or the glare from the lighting on the blackout switch panel. This device is intended for use in emergency vehicles, in particular, police squad cars, snowmobiles, all terrain vehicles, ski jets, boats, and the like.

At the discretion of a trained professional, the operations of the vehicle may be made less apparent to those outside the vehicle. This may prove useful under certain situations. For example, if a squad car passes a suspect in a parked car at night, the officer would have several additional options to investigate without the suspect becoming suspicious of the surveillance. The officer could select any of the following procedures according to the specific circumstance: (a) prevent the brake, interior dome, and backup lights from coming on so as to allow the officer to back up his squad car without detection; (b) stop the squad car, let his partner out of the squad car, and go on foot to investigate; drive out of view after passing the suspect, extinguish all his lights, and turn on his sneak light, thereby allowing him to pull up to the parked car without detection and turn on the police emergency lights to catch the suspect off guard; or (d) drive by a suspect car in the evening with the squad car's headlights on, return by extinguishing the right low beam headlight for further investigation to give the appearance of a different car to avoid suspicion. In the past, an officer was killed when the interior dome light was illuminated to expose the unsuspecting officer inside when an armed suspect was pulled over. This danger is minimized with the present system.

Since each of these features, brake lights, running lights (headlights, parking or corner lights and tail lights), and backup lights, are placed within vehicles to insure safe driving, operation of the blackout control systems should only be used by trained professionals.

Accordingly, it is a principal object of the present invention to provide improved blackout control systems insertable within the electrical system of an emergency vehicle such as a police squad car which extinguishes certain lighting features for rendering the vehicle less visible to others outside the vehicle.

It is an object of the invention to provide improved blackout control systems which comprise a blackout switch panel unit, a wiring harness unit, and a blackout control unit.

It is another object of the invention is to provide a blackout control system having special flashing and passing features.

It is a further object of this invention to provide an override control for negating the disabling of blackout lights upon activation of a manually activated switch.

It is a object of this invention to provide visual and audible warning to the operator with activation of manual blackout switches.

Another object of the invention is to provide bypass plug-in units which permit the return of the vehicle's electrical system to the original state without removal of the improved blackout control systems which include the harness unit by replacing the control unit with the plug-in unit.

It is a further object of this invention to reduce the blackout switch panel lighting for evening blackout operations.

Another object of this invention is to have the interior dome light remain off when one or more of the emergency red light switches are activated.

It is a further object of this invention to provide a headlight daytime running lights (DRL) control feature which activates the headlights in the daytime to make the vehicle more noticeable in traffic.

It is another object of this invention to combine the blackout switch panel with a vehicle's siren head.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 5 is a bypass plug-in unit which can be connected to the wiring harness unit of FIG. 3 by replacing the control system unit to nullify the blackout control system of FIGS. 1–4.

FIG. 8 is a second bypass plug-in unit which can be connected to the wiring harness unit of FIG. 6 to nullify the blackout control system of FIGS. 1, 6 and 7.

Similar reference characters denote corresponding features consistently throughout the attached drawings.

DETAILED DESCRIPTION OF THE PREFERRED EMBODIMENTS

Figure 1A:
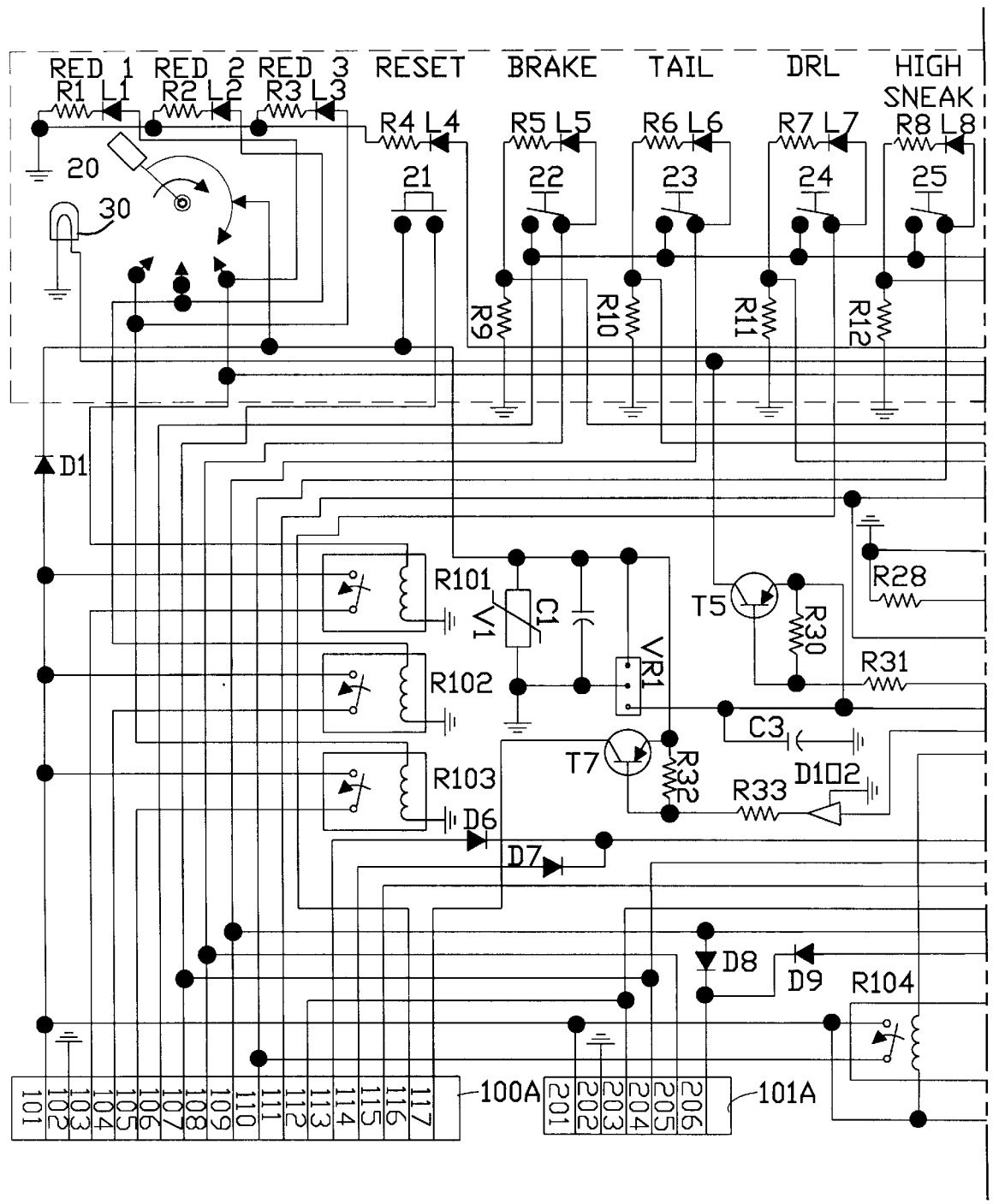
FIG. 1 is a wiring diagram of the blackout switch panel unit of the first embodiment of the present invention and adaptable to the combination of the second embodiment.
Figure 1B:
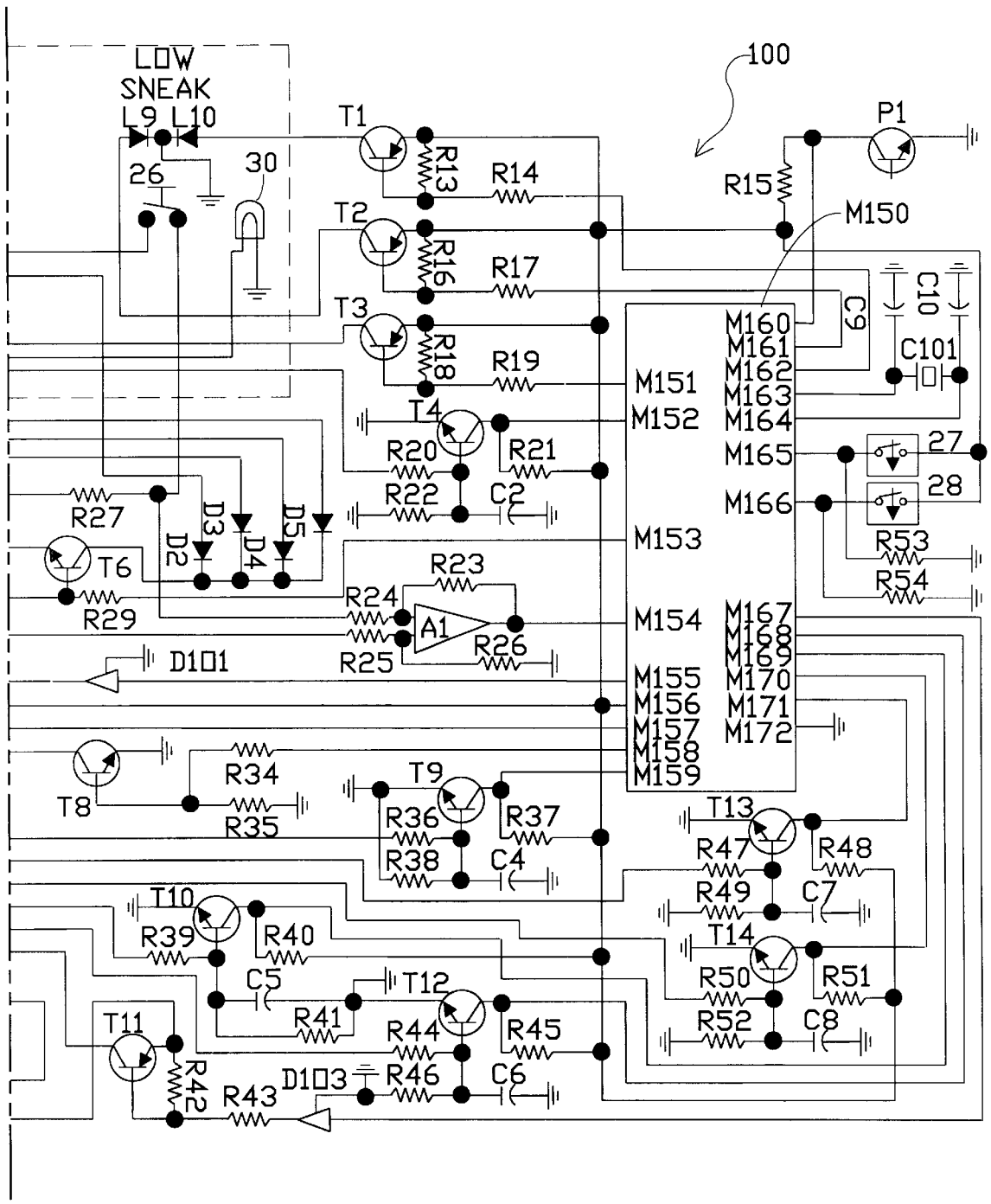

The improved blackout switch panel unit 100 as illustrated in FIG. 1 is common to the first three embodiments, and is designed to be connected to a conventional emergency vehicle's electrical wiring system. For the purposes of the present invention, a conventional vehicle's wiring system will include the following components: (1) a brake switch for supplying power to the rear brake lights upon application of the brakes of the vehicle; (2) a backup switch for supplying power to the backup lights upon activation of the reverse gear of the vehicle; (3) a manually activated running light switch to provide, upon activation thereof, power to running lights, i.e., parking or corner lights and tail lights, of the vehicle; (4) a manually activated high beam switch to provide power to the high beam lights of the vehicle when activated; (5) an interior dome light having a connection to the battery and to the door switches for supplying a ground connection to the dome light upon opening a door, thereby allowing current to turn on the inner dome light when a door is opened; (6) a headlight switch which normally controls the headlights when activated fully (also, the running lights' switch when activated either partially or fully); (7) the dashboard dimmer switch of the vehicle may also be controlled by the headlight switch; and (8) the vehicle headlight daytime driving lights (DRL) control which supplies power to activate the headlights or auxiliary lighting during daytime to make the vehicle more noticeable to daytime traffic.

The digital displays within the vehicle operate in two modes, a daytime mode and a nighttime mode. The automotive manufacturers provide this feature in their vehicles to allow the user to see the bright digital displays clearly during the daytime, while allowing the user to dim the displays in low light situations, such as in the evening. The digital displays of the radio, heater and clock have a built-in bright mode selector switch which shuts off when the running lights are turned on, thereby placing the digital displays in the nighttime mode in which the digital displays are dimmer than in the daytime mode. With the running lights off and the ignition switch on, the digital displays of the heater and radio are placed in the daytime mode and are brightly illuminated so as to be visible during the day.

In FIG. 1, the blackout switch panel circuit 100 has 17 panel connector wires, wires 101–117, which connect directly at 100A to the harness units of any of the two blackout control system embodiments. There are seven switches on the blackout switch panel A as follows: One four-position emergency red light switch 20 (alternately referred to hereinafter as Red 1, Red 2 and Red 3, respectively, and collectively as Reds); a reset switch 21; a brake light switch 22; tail light switch 23; a daytime running lights switch 24 (DRL); a high sneak light switch 25; and a low sneak light switch 26. Each switch is illuminated with visible light emitting diodes or LED's L1 through L10 with protective resistors R1 through R8 present in each switch circuit with the exception of L9 and L10 which uses the low voltage of the microprocessor M150. The blackout switch panel A is illuminated by two panel lights 30 located behind the panel labeling. The four-position Red light switch 20 (first position is an off position) is directly connected to the red lighting relays R101, R102 and R103 which are respectively connected to panel connector wires 103, 104 and 105 of the panel connector bus bar 100A. Red switch 20 is a progressive level switch that will combine level one (Red 1) with level two (Red 2) and combining levels one and two with level three (Red 3) in the fourth position. These switch levels are powered by the vehicle battery through wire 101. From wire 101 this power passes through diode D1 which will prevent the installer from accidentally reversing battery polarity and preventing damage to the solid state circuits. Power passes through diode D1 to red switch 20. When level one or Red 1 is activated, power passes to the coil of relay R101, closing the normally open contacts. With the closure of the contacts, power from wire 101 is connected to wire 103. Similarly, level two (Red 2) and level three (Red 3) activate the coils on relays R102 and R103, respectively, suppling power to respective wires 104 and 105 of panel connector bus bar 100A.

Switches 23, 24, 25, and 26 are called blackout switches. Switch 21 on the blackout switch panel A is a momentary push button with switches 22–26 as single pole, single throw on-off switches. The illumination of switches 20–25 is accomplished by respective LEDs L1–L8. When power is supplied by a switch to an LED, it passes through its resistor,e.g., R1–R8, to ground, thus illuminating the LED. The illumination of the LED for the reset switch 21 is achieved each time the power to the red switch 20 (Red 1) is dropped, thus signaling the microprocessor M150 to supply power to the L4 LED. At this time the LED will blink to remind the officer to reset the blackout switch power. Once the reset switch 21 has been activated, the microprocessor will disable the blinking L4 LED on the switch 21. When the reset switch 21 is activated, voltage passes through resistor R47 to the bipolar transistor T13 to ground. This forward biasing of T13 will allow for the current to flow from the voltage regulator VR1 through resistor R48 and transistor T13 to ground, thus dropping the voltage on pin M171 and signaling the M150 microprocessor that a reset has been effected. Resistor R49 is used to pull down or equalize transistor T13 when power is absent from R47. Capacitor C7 is used to filter voltage from the reset switch 21. When the red switch 20's level one (Red 1) is activated, voltage passes through resistor R20 to the bipolar transistor T4 to ground. This forward biasing of T4 will allow for the current to flow from the voltage regulator VR1 through resistor R21 and transistor T4 to ground, thus dropping the voltage on pin M152 and signaling the M150 microprocessor that red 1 is on. The resistor R22 is used to pull down or equalize transistor T4 when power is absent from resistor R20.

Capacitor C2 is used to filter voltage from the red switch 20 or Red 1. Once the microprocessor M150 receives the signal that the power to Red 1 has been stopped, the microprocessor will supply a ground from pin M151, thereby allowing current from resistor R18 to be taken from the bipolar transistor T3 to pass through resistor R19 to the microprocessor M150. This forward biasing of transistor T3 will allow the current to flow from the voltage regulator VR1 through transistor T3 to the blinking LED L4.

The last blackout switch, low Sneak switch 26 is illuminated by LEDs L9 and L10 under the control of the microprocessor M150. The function of the low sneak switch 26 will be fully explained hereinafter.

The blackout switch panel A is illuminated by two panel lights 30 located behind the panel labeling. The panel lighting is activated by the microprocessor M150. When the processor M150 senses a nighttime condition on the phototransistor P1 with the vehicle's ignition switch on (wire 112), the microprocessor M150 will turn on the panel lighting by operation of the phototransistor.

When the phototransistor senses the lack of daylight (the level can be adjusted) at night, the ground is allowed to pass to the power resistor R15, thus dropping the voltage to pin M160 on the microprocessor M150. In conjunction with this signal, voltage is supplied by wire 112 from the vehicle ignition through resistor R39 to the bipolar transistor T10 to ground. This forward biasing of T10 will allow for the current to flow from the voltage regulator VR1 through resistor R40 and transistor T10 to ground, thereby dropping the voltage on pin M169 and signaling the microprocessor M150 that the vehicle's ignition is on. Capacitor C5 provides filtering and resistor R41 stabilizes transistor T10. It is also contemplated in the present invention to utilize a photocell as an equivalent photosensitive means to the phototransistor.

With the vehicle ignition on during a nighttime condition, the microprocessor M150 sends a ground signal from pin M155 to the driver D101, with the driver connecting ground through resistor R31, allowing current from resistor R30 to be transferred from the bipolar transistor T5 though the resistor R31 to ground and the driver D101. This forward biasing of transistor T5 will allow the current to flow from the voltage regulator VR1 through the transistor T5, thereby energizing the panel lighting 30.

For non-blackout day or night operations, the microprocessor M150 sends voltage from pin M153 to the resistor R29, the bipolar transistor T6, and to ground. This forward biasing of transistor T6 will allow for the current to flow from the LED's of the blackout switches 22–25 through respective diodes D2–D5 through the transistor T6 to ground, thus energizing the blackout switch LED's to full intensity at all times.

With blackout switch 23 (taillight) activated on microprocessor pin M168 and the phototransistor P1 off on pin M160, the microprocessor will remove voltage from pin M153, disabling transistor T6, forcing the blackout switch LED's to receive grounding from resistors R9–R12, thus dimming the LED lighting for blackout operations.

By calibration of resistors R9–R12, an acceptable reduction in blackout switch illumination is achieved. Diodes D2–D5 prevent feedback of the operation of one switch affecting the lighting intensity of the other blackout switches. In addition to this condition, when the tail blackout switch 23 is applied, the micro- processor M150 will permit the cessation of the ground signal on pin M155 to the driver D101, thus disabling the panel lighting 30.

When any of the three emergency red light switch 20 levels are turned on, the current to the other five remaining blackout switches 22–26 is disabled until the red light switches are deactivated and the blackout panel momentary reset switch 21 is activated. This resetting function is accomplished by the dual coil latching of the blackout switch override relay located inside the blackout control unit such as relay R409 in FIG. 4. For example, when Red 20 (level one) is engaged, closing the contacts in relay R101, supplies current through wire 103 of connector 100A through connector wire 303 of FIG. 3, through wire 403 of connector 400A of FIG. 4, and through feedback diodes D407 and D410 to the blackout switch override relay R409, thus opening the contacts which supply power to the blackout switches by wire 406 through wire 306 of FIG. 3 and connecting to wire 106 of the switch panel connector 100A. When the operator wishes to reactivate the blackout switches 22–26, the operator simply pushes the reset switch 21 to activate the opposite coil of the dual coil override relay R409, closing the contacts and supplying current to blackout switches 22–26 by wire 106.

The switch 20 for Reds 1–3 are labeled as such, but are also visually identified readily by colored LED's positioned above the switches in the blackout panel A, i.e., Red 1 is green, Red 2 is yellow and Red 3 is red. Red 1 is used for rear lighting of flashing brake and backup lights. The red rear brake lights and white backup lights have an up and down flash pattern with both brake lights on while both backup lights are off, alternating with backup lights on while the brake lights are off. With optional switch S405 in FIG. 4 closed, power can be allowed to pass through diode D407, switch S405 and diode D404 to activate the dome light relay R408, thus preventing the dome light from being activated with any of the red emergency lights engaged. Red 2 as with Red 1 is utilized as a lower level of lighting after a pursued vehicle has been pulled over with only the flashing red grill lights, rear brake lights and backup lights on. Also, during this operation the interior dome light can be optionally deactivated for an officer's safety as mentioned with the description above. Red 3 is the highest level of lighting for pursuing another vehicle with all the lights on and flashing, i.e., headlights, red grill lights, rear brake, and backup lights with the same flashing pattern as with Red 1. Other conventional multiple flash pattern flashers can be used with this blackout system. During this operation the interior dome light is deactivated for officer safety as mentioned above.

A new feature of the present invention permits the microprocessor M150 to disable the high beam flash on level three or Red 3. This provision is for agencies or states requiring no head light flash at nighttime. With the switch panel in the nighttime condition, the microprocessor M150 sends a ground signal from pin M157 to the driver D102, allowing the driver to connect a ground to the resistor R33. This action will allow current from resistor R32 to be transferred from the bipolar transistor T7 to the resistor R33. This forward biasing of T7 will allow the current to flow from wire 101 through the transistor T7, thus energizing wire 117 connecting the coil of the high beam flash override relay R710 (FIG. 7) and opening the contacts and nullifying power to the high beam flash relay R711.

Brake blackout switch 22 cuts out brake, backup and dome lights. Tail lights' switch 23 cuts out or deactivates tail or running lights (parking and tail) and dashboard lighting which includes the lighting of the digital radio, heater and clock displays.

Figure 2:
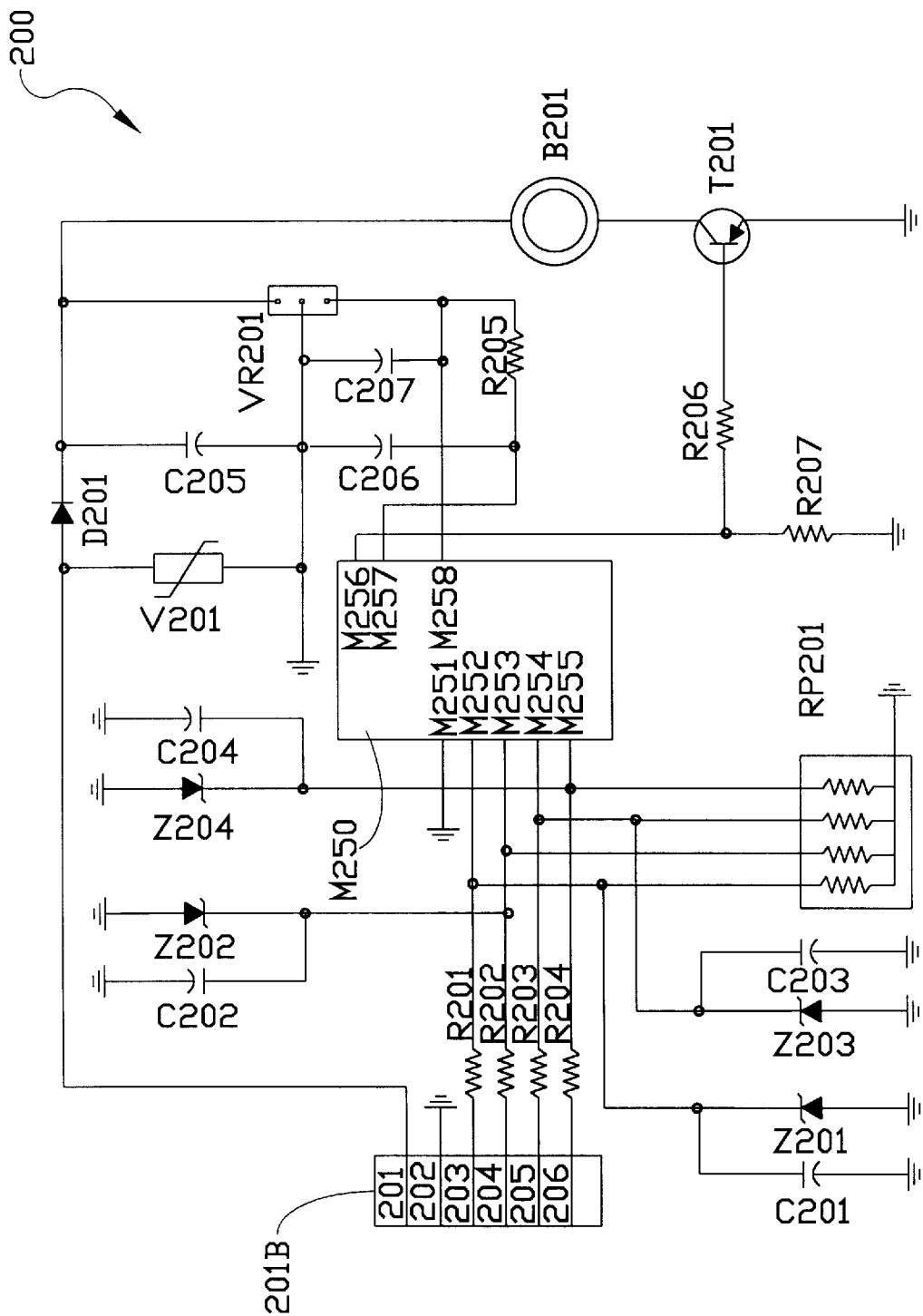
FIG. 2 is a wiring diagram for the audible warning unit attachable to the blackout switch panel unit of the first embodiment of the present invention and or the control system units of the first and second embodiments.

Another innovative feature is added to the blackout brake switch 22 and the tail switch 23. With the engagement of any one of these switches a audible warning system or audio board 200 in FIG. 2 is initiated. Anytime the blackout switch 22 and 23 are engaged, a beep will sound once and continue beeping once every ten seconds alerting the officer to the blackout condition. During surveillance stakeouts with the vehicle ignition off, the officer can disable the warning beep by pushing the reset switch 21. Each time the vehicle ignition is turned on (with the blackout switches on) the audible warning system will automatically alert the officer by reinstating the beep cycle. This audible feature is especially effective should the officer leave the vehicle. Upon returning to the vehicle and turning on the ignition, the officer will be audibly alerted that the blackout switches are still operative.

This is accomplished by the audio board 200 in FIG. 2. Note that this audible warning system can also be used in the blackout control units FIGS. 4 and 7. In the event that a police department chooses to use a conventional switch panel with the blackout control unit, the audio board 200 can be installed into the control units FIGS. 4 and 7 by connector 201B to give the officer audible warning protection.

Battery power enters the audio board 200 on wire 201 passing through diode D201 to prevent reverse polarity by the installer. This voltage is given surge protection by the varistor V201 and filtering by capacitor C205. The voltage regulator VR201 reduces the voltage for use by the micro processor M250 and is also filtered by capacitor C207. When a input voltage is applied by any of the wires 203, 204, 205, and 206, the voltage is reduced by one- half by the respective input resistors R201, R202, R203, and R204, and the pull down resistor pack RP201. These inputs are also filtered by respective capacitors C201, C202, C203, and C204 with additional reduction of voltage by respective Zener diodes Z201, Z202, Z203, and Z204. The input voltages from wires 203–206 to the microprocessor M250 by respective pins M252, M253, M254, and M255 are held to a minimum by the pull-down resistor pack RP201 until a voltage is applied to the input by any of the blackout switches 21–23 or the ignition switch on wire 203. Pin M251 is the ground wire 202 to the power supply to the microprocessor M150. Pin M268 is the power supply to the microprocessor M250, with pin M257 used as the input from the resistor R205 and capacitor C206 to signal the microprocessor's internal clock for beeper timing. For example, when voltage is applied to the microprocessor's pin M254 by the blackout switch 22, the power supply voltage on pin M258 is supplied to the microprocessor output on pin M256, sending voltage through resistor R206 to the transistor T201 and to ground. This forward biasing of T201 will allow the current to flow from wire 201 through the buzzer B201 to T201 to ground and activate the buzzer.

The DRL switch 24 can deactivate the following three different applications dependent on the vehicle application with wire 116: (1) vehicle using headlights for DRL; (2) vehicle using auxiliary lighting (such as front turning lights) for DRL; and (3) vehicle not using DRL lighting. An explanation of the options will be described in more detail in the discussion of FIGS. 4 and 7.

The high sneak light switch 25 controls the high beam sneak light mounted on the front of the vehicle by wire 110 in FIG. 1. The low sneak light switch 26 operates a low beam sneak light on the front of the vehicle and has a hood to direct the light downward (separate from the high and low beam headlights). The safety of the low sneak light driving operation has also been greatly enhanced. When the micro processor M150 in FIG. 1 detects that the tail blackout switch 23 and the low beam sneak light switch 26 are on with the vehicle headlights off, the following low beam sneak light's safety feature will be initiated.

If for any reason the power to the low sneak light 52 is disabled or the bulb in the low sneak light should burn out, the microprocessor M150 will automatically turn on the high sneak light to maintain lighting to the front of the vehicle. When the blackout switch 23 is energized, voltage passes through resistor R44 to the bipolar transistor T12 and to ground. This forward biasing of T12 will allow for the current to flow from the voltage regulator VR1 through resistor R45 and transistor T12 to ground, thus dropping the voltage on pin M168 signaling the microprocessor M150 that the taillight blackout switch 23 is on. The resistor R46 is used to pull down or equalize the transistor T12 when power is absent from the resistor R44. Capacitor C6 is used to filter voltage from the taillight switch 23. In addition, the low sneak blackout switch 26 is activated allowing current to pass through the resistor R27 to the wire 111 leading to the low sneak light 52. The microprocessor can sense the current to the low sneak light by use of the amplifier A1. Resistor R24 is connected to the power coming from the low beam sneak light switch 26 to the A1 amplifier, with resistor R23 connected to the amplifier output to the micro- processor pin M154, with resistors R25 and R26 used by the amplifier A1 to compare the current through resistor R27 passing to the low beam sneak light. The microprocessor M150 will use this information to detect that the low beam sneak light blackout switch 26 is on. The microprocessor will also examine if the vehicle headlamps are off. This is achieved when power from the low beam headlights on wire 113 passes through the diode D6 through the resistor R36 to the bipolar transistor T9. The transistor T9 can also be activated by the high beam headlights by wire 114 passing through feedback diode D7 to the resistor R36 and to the bipolar transistor T9. The forward biasing of T9 will allow for the power to flow from the voltage regulator VR1 through resistor R37 and transistor T9 to ground, dropping the voltage on pin M159 signaling the microprocessor M150 that the vehicle's low and high beam headlights are off. The resistor R38 is used to pull down or equalize T9 when power is absent from R36. Capacitor C4 is used to filter voltage from the headlamps. In the event the light bulb in the low beam sneak light 52 should burn out, the current on resistor R27 stops signaling amplifier A1 via the microprocessor M150 to turn on the high beam sneak light. This is accomplished by the microprocessor M150 connecting power supply voltage on pin M156 to the microprocessor output pin M158 sending voltage through resistor R34 to bipolar transistor T8 to ground. This forward biasing of T8 will allow the current to flow from wire 101 through the coil on relay R104 to the bipolar transistor T8, grounding and activating the relay, thus closing the contacts on relay R104 suppling power to wire 110 which is connected to the high sneak light 51. Resistor R35 is used to equalize or hold the voltage on the transistor T8.

In addition to this innovation, another safety feature will give the officer audible and visual warning not to exceed a preselected speed limit. The officer and the police department will have the option to preselect a safe speed that the vehicle will travel during blackout driving dependent upon the terrain and location the vehicle will operate in. Once the preselected speed is reached an audible warning beep will sound, warning the officer not to exceed the speed limit. In the event the officer exceeds the preselected speed limit, the microprocessor M150 monitoring the circuits will automatically turn on the high beam sneak light to increase visibility to the front of the vehicle. In addition, the colored indicator LEDs L9 and L10 on the low sneak switch 26, offer visual warning not to exceed the preselected speed limit. LED L9 will light with a steady green light within the desirable speed range. Once that range is exceeded the red LED L10 will blink warning the officer that the speed may be exceeded (at the same time offering an audible beep). Once the preselected range is exceeded, the red LED L10 will offer a steady red light initialing the high beam sneak light 51.

This visual lighting is not limited to the embodiment of the switch panel and can be mounted externally. The speed setting is selected by switches 27 and 28. When both switches are closed, power is supplied to the microprocessor M150's pins M165 and M166. When the switches are open, resistors R53 and R54 supply the micro- processor pins M165 and M166 with an "off" signal. The speed selections on the switches 27 and 28 are as follows. (1) 27-28 on; (2) 27 on-28 off; (3) 27 off-28 on; and (4) 27-28 off.

The microprocessor will monitor the vehicle speed by wire 115 tapping into the vehicle speed sensor circuit much like the vehicle cruise control. The "on" and "off" voltage signals generated from the vehicle speed sensor travels through wire 115 to the resistor R50, the bipolar transistor T14 and to ground. This forward biasing of T14 will allow the current to flow from wire 101 through diode D1 to the voltage regulator VR1. This voltage is given surge protection by the varistor V1 and filtering by capacitor C1 traveling through the voltage regulator VR1, resistor R50 and transistor T14 to ground, thus dropping the voltage on pin M170 signaling the microprocessor M150 of the "off" signal. When the voltage is removed from the resistor R50, the transistor T14 will produce an "on" signal for the microprocessor on pin M170, thus replicating the signal from the vehicle speed sensor. The resistor R52 is used to pull down or equalize the bipolar transistor T14 when power is absent from resistor R50. Capacitor C8 is used to filter voltage from the speed sensor.

The safety audible beep portion of this invention is also controlled by the microprocessor M150. Pin M167 of the micro processor M150 signals a ground from pin M167 to the driver D103, permitting the driver to connect ground at the driver through resistor R43, the bipolar transistor T11, and to the voltage from wire 101. The forward biasing of T11 will allow for the current to flow from wire 101 through the transistor T11 and the diode D9 to the wire 206 on connector 101A, thus energizing the audio board 200 to sound the buzzer B201.

The low sneak switch LEDs L9 and L10 are also controlled during this low beam sneak safety mode as described above. The microprocessor M150 will supply a ground from pin M161 through resistor R17 and the bipolar transistor T2 to the voltage from the voltage regulator VR1. This forward biasing of transistor T2 will allow for the current to flow from the voltage regulator VR1 through transistor T2 to the green LED L9. When the preselected speed is close to its limit, the microprocessor M150 will supply a pulsing ground from pin M162 through resistor R14 to the transistor T1 and to the voltage from the voltage regulator VR1. This forward biasing of T1 will allow the current to flow from voltage regulator VR1 through transistor T1 to the red LED L10.

The oscillator used to control the LED flash rate is provided to the microprocessor M150 on pins M163 and M164, connecting to the crystal C101 and capacitors C9 and C10. When the preselected speed limit is exceeded, the microprocessor M150 will send a steady ground from pin M162 through resistor R14 to the transistor T1.

Another provision is the non-illumination of the right low beam headlight during a surveillance of a suspect. The low beam sneak light switch 26 energizes the right low beam light cutout relay R403 (FIG. 4) to terminate power through the circuit of pins 419 and 420, thereby blacking out the right low beam headlight 53 as illustrated in FIG. 3.

Figure 3A:
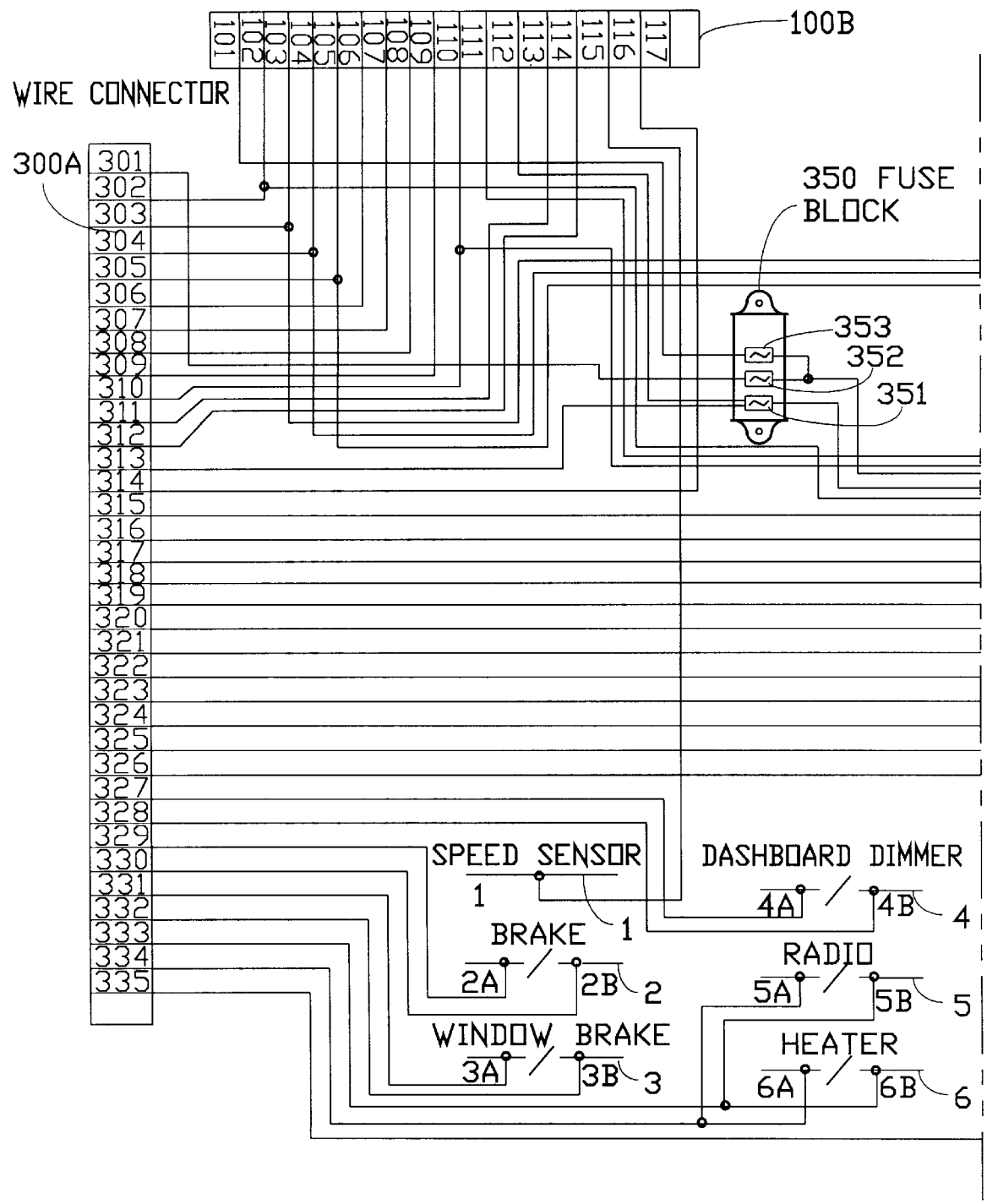
FIG. 3 is a wiring diagram for the harness unit attachable to the blackout switch panel unit of the first embodiment of the present invention.
Figure 3B:
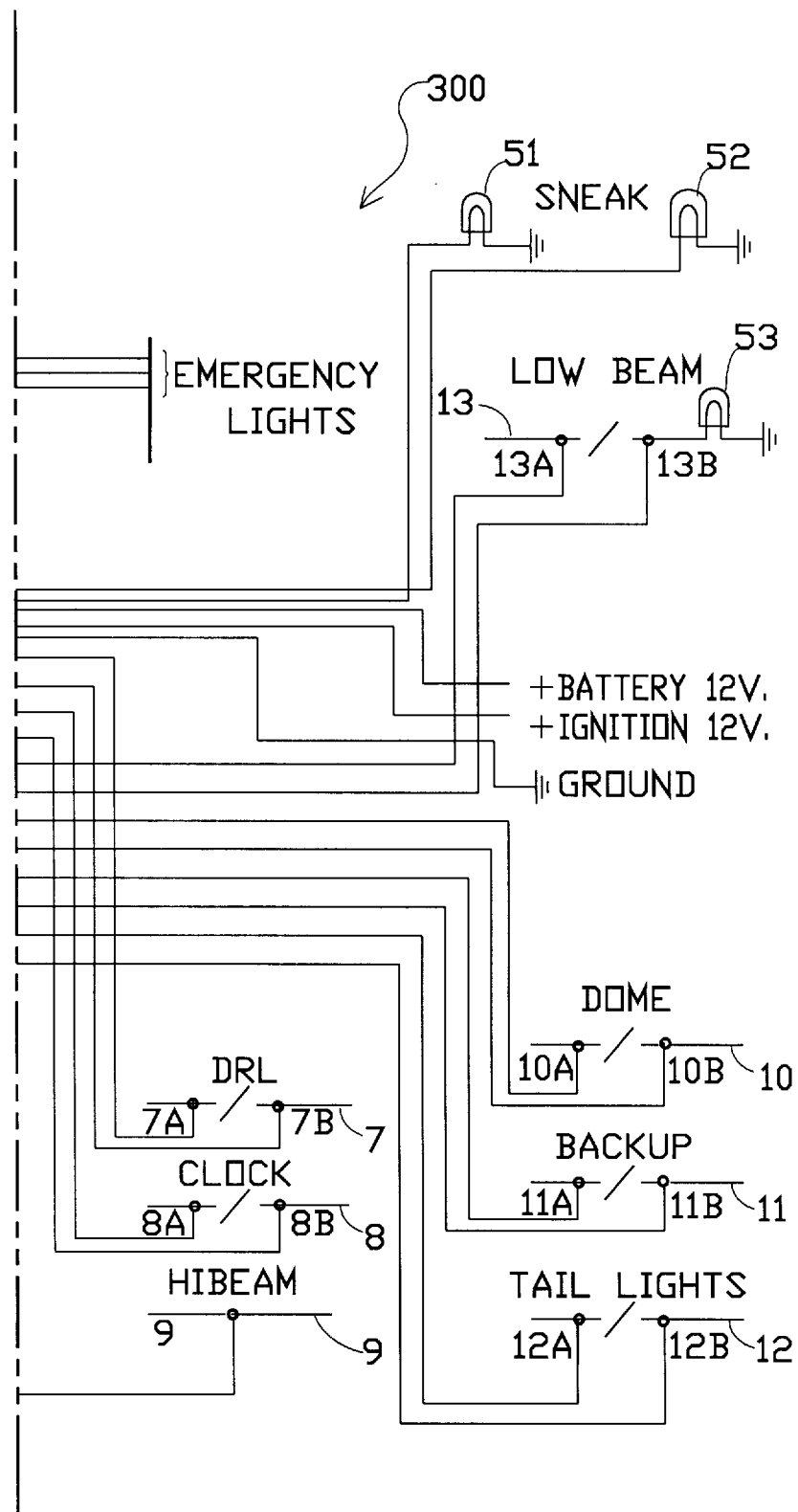
Figure 4A:
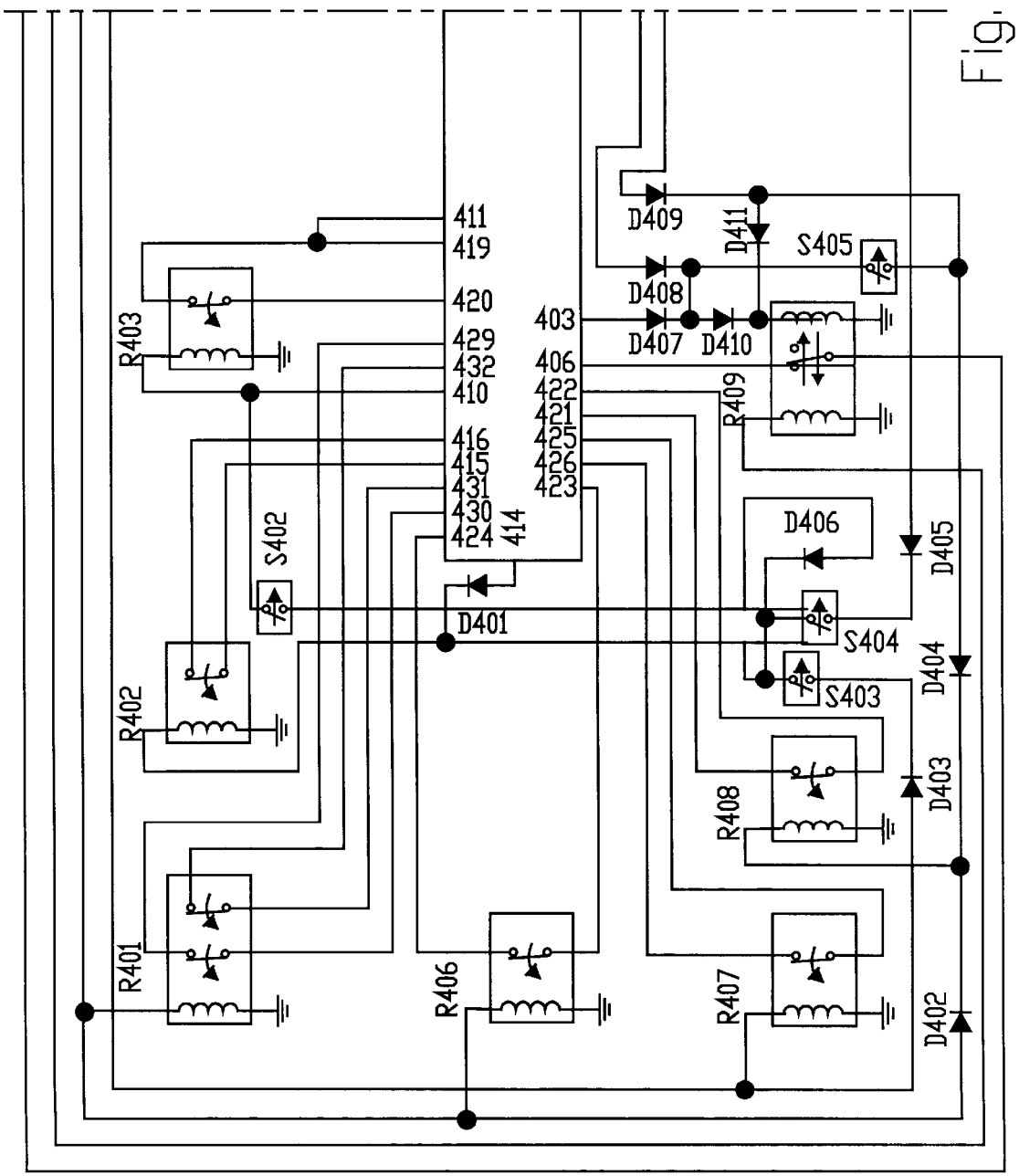
FIG. 4 is a wiring diagram for the control system unit of the first embodiment of the present invention.
Figure 4B:
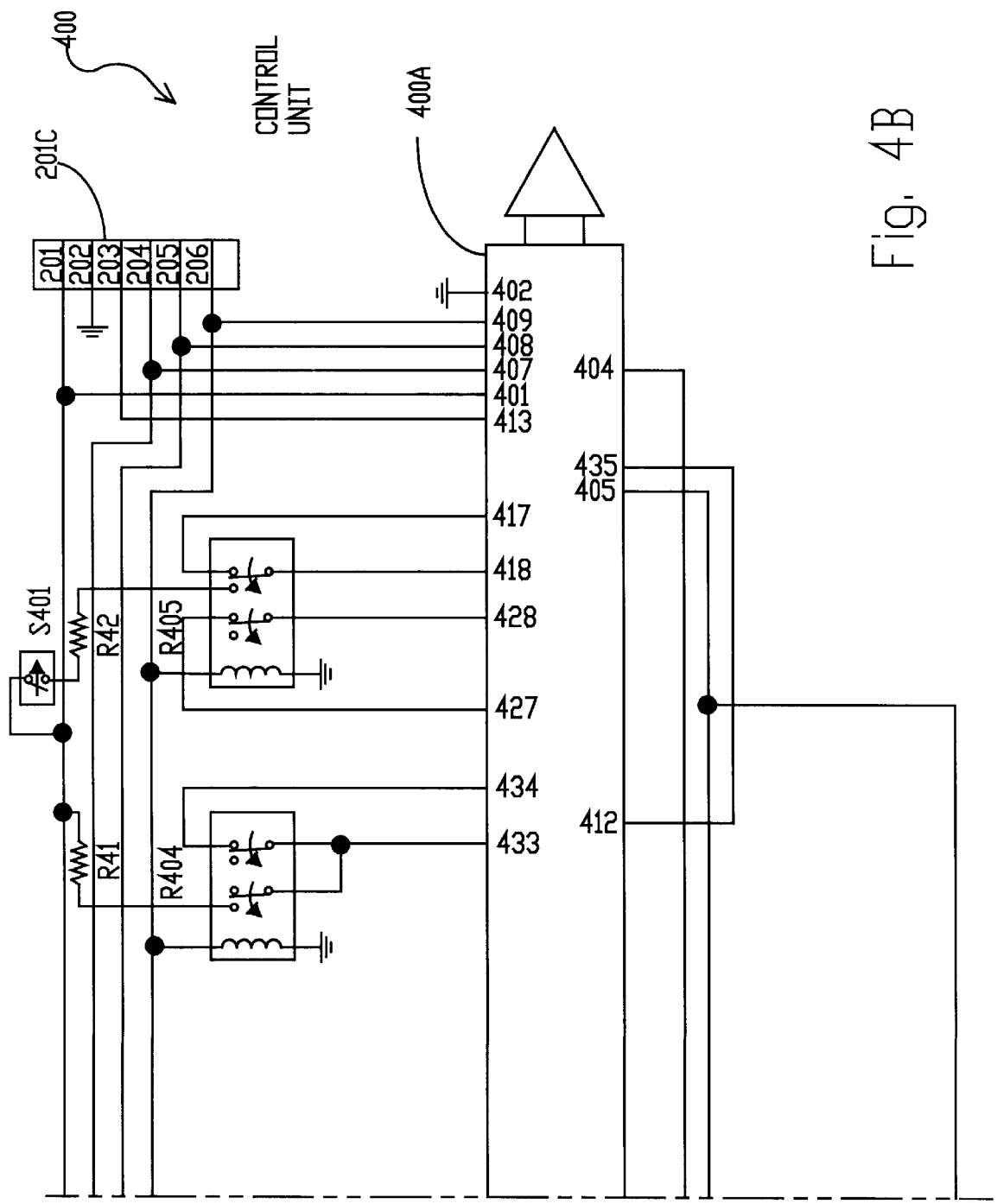

The FIG. 3 wiring harness 300 is designed to be installed with the vehicle's present wiring harness between the blackout switch panel circuit 100 of FIG. 1 and the control unit 400 of FIG. 4. Note that panel connector wires 101 through 117 of the panel connector bus bar 100A in FIG. 1 are continued into FIG. 3 as 100B. The wiring harness 300 is attached at one end to various parts of the electrical lighting system of the vehicle, and at the opposite end to a wire socket and pin connector unit 300A having wire sockets and pins 301–335. The power from the battery is transmitted to the illuminated switch panel A through fuse block 350 and fuse 353 to the connector 100B wire 101. Fuse 352 transmits power to connector 300A's wire 301. Vehicle ignition power is also supplied to the switch panel by fuse 351 to wire 112 of connector 100B additionally supplying power to connector 300A's wire 313. A ground line is also connected to 300A's connector wire 302 and to the switch panel A through panel connector wire 102.

More specifically, as shown in FIG. 3, the harness unit 300 includes connections to the illuminated blackout switch panel A which allows a user to perform the following operations: (1) Turn on all the emergency red lights of the vehicle through the use of the progressive three level red switch 20 or Reds 1–3. (2) Since the FIG. 3 harness is designed with neither emergency red lights nor headlight wig-wagging flashers, the officer will use Reds 1–3 to supply current to the existing emergency lighting system on the patrol car. (3) Cut out the rear window brake light 3, the backup lights 11, the rear brake lights 2, and interior dome light 10 through the use of switch 22. (4) Cut out the DRL control or daytime running lights 7, the taillights 12 or running lights, the dashboard lights 4, radio display lighting 5, heater display lighting 6, and the clock display 8 through the use of switch 23. (5) Cut out the DRL manually for headlight DRL through use of switch 24. (6) Turn on the high sneak light 51 mounted on the front of the vehicle through the use of switch 25. (7) Turn on the low sneak light 52 located in the front of the vehicle through the use of switch 26.

The sneak light 51 produces less light than the vehicle headlights, with the low beam sneak light 52 purposefully producing less light and aimed down at the road at a greater angle than the conventional headlights so as to provide only enough light for the driver to see directly in front a predetermined minimum distance while traveling. As mentioned above, the low beam sneak light switch 26 provides a unique cutting or non-illumination of the right low beam headlight 53 while the other headlight is left illuminated for a return trip to view the suspects through the use of the cutout relay R403 of FIG. 4 and harness connector wires 319 and 320.

As shown in FIG. 3, the wire socket connector unit 300A has 35 pin connections, i.e., 301–335, wherein panel connector wires 302–310 are directly connected to corresponding numbered pin connections 102–110 in FIG. 1 with the remaining numbered pin connections 311 to 113, 312 to 114 and 116 to 314. Pin connection 115 connects to the speed sensor 1 and pin 117 is used in the next embodiment FIG. 6. Pin 101 is connected to the vehicle's battery with fuse 353 in fuse block 350 with pin 301 also connected to vehicle battery by fuse 352 in fuse block 350. Pin 102 is connected to pin 302 which is connected to ground. Note that wires from pins 103–105 also are connected to the emergency lights' wiring which are present in the vehicle. Pins 103–105 are connected to the lines providing power to the police vehicle's emergency lights or Reds 1, 2 and 3. Upon activation of any of the red lights' switch 20 levels or red 1–3, power is supplied to the respective pins 103–105 and respectively to pins 303–305. Pin 106 is connected to pin 306. Pin 107 is connected to pin 307. Pin 108 is connected to pin 308. Pin 109 is connected to pin 309. Pin 110 is connected to pin 310 and to the high sneak light 51. Pin 111 is connected to the low sneak light 52. Pin 112 is connected to the fuse 351 on fuse block 350 connecting to the vehicle ignition. Pin 113 is connected to the pin 311. Pin 114 is connected to the pin 312. Pin 115 connects to the speed sensor 1 and pin 117 is used in the next embodiment FIG. 6 for high beam flash override.

The wires leading to the various following vehicle elements are existing wires. The wire connecting to pin 115 is connected to the vehicle speed sensor 1. The wire supplying power to the brake lights 2 is cut, and wire 2A supplying the power from the brake lights is connected to pin 329 while the wire 2B leading to the brake lights is connected to pin 330. The wire supplying power to the vehicle's rear window brake light 3 is cut, and the wire 3A is connected to pin 331 with wire 3B connected to pin 332. The wire coming from the dashboard dimmer light 4 is cut, the wire 4A being connected to pin 327 with the wire 4B being connected to pin 328. The wire from the radio's (5) digital display is cut, and the wire 5A leading from the radio digital display is connected to pin 334. The wire 5B is connected to pin 333. The wire from the heater's (6) display is cut, and the wire 6A leading from the heater's digital display is connected to pin 334. The wire 6B is connected to pin 333. Wire 5A of the radio display 5 and wire 6A of the heater display 6 are joined and connected to pin 334.

Similarly, wires 5B and 6B are connected by pin 333 to the running light switch, and lead to the bright mode selector switches of the radio digital display and the heater digital display. When power is supplied to the bright mode selector switches as the running lights are turned on, the digital displays are placed in their nighttime mode of operation. The power received by wire 5B of the radio display 5 and wire 6B of the heater display 6 are control signals only, placing the displays in their nighttime mode, but do not supply power to the displays. The actual power to light the digital displays when placed in the nighttime mode comes from the wire coming from the vehicle's dashboard dimmer control switch to the display lights so as to allow the driver to adjust the intensity of the digital display lights through the use of the vehicle's dashboard dimmer control switch. The wire supplying power to the vehicle's daytime running lights control 7 is cut, and the wire 7A is connected to pin 315 with the wire 7B connected to pin 316. The wire from the clock's 8 digital display is cut, and the wire 8A leading from the radio digital display is connected to pin 317. The wire 8B is connected to pin 318. The clock display works on the same principle as described with the radio and heater displays 5 and 6, respectively. The high beam 9 wire connecting from the high beam switch to the high beam headlights is connected by pin 335. The wire coming from the interior dome light 10 which is controlled by the door switch (not shown) is cut. The wire 10A coming from the interior dome light power is connected to pin 321. The wire 10B going to the interior dome light 10 is connected to pin 322. The wire coming from the backup switch and leading to the backup lights 11 is cut, and wire 11A coming from the backup lights 11 is connected to pin 323, while wire 11B going to the backup lights 11 is connected to pin 324. The wire of the vehicle leading from the running light switch to the tail lights 12 is cut, the wire 12A being connected to pin 325, and the wire 12B being connected to pin 326. The wire leading from the headlight switch to the right low beam headlight 53 is cut, forming wires 13A and 13B connected to pins 319 and 320, respectively.

Some radio manufacturers do not use the dimmer control switch to energize the digital display, but supply power directly from the ignition key switch. Consequently, when the dimmer switch signal is cut, the digital display returns to its daytime bright illumination mode. In this situation, resistor R41 in FIG. 4 is used to regulate the current to the digital display lights similar to the rheostat on the vehicle dimmer control.

In FIG. 4, the blackout control unit 400 includes a wire plug connector unit 400A which connects to the wire socket connector unit 300A of the harness 300 wired to the vehicle, so as to provide a connection of pins 401 through 435 to, respectively, socket pins 301 through 335. In this manner, the blackout control unit 400 can be removed from the vehicle without having to disconnect the harness 300 by simply disconnecting the wire plug connector unit 400A from the wire socket connector unit 300A. Note connector 201C of control unit 400. In the event the blackout switch panel 100 is not used with wiring harness 300 and control unit 400, the safety audio board 200 in FIG. 2 connector 201B can be connected to the control unit 400 connector 201C expanding officer safety. With the wire plug connector 400A connected to the harness, and all switches 20 through 26 of the illuminated switch panel A in the "off" position, the relay switches of the blackout control unit 400 form the electrical connections of the vehicle prior to the installation of the harness 300.

More specifically, with all of the relays of the blackout control unit 400 deactivated, both of the normally closed switches of the brake and rear window brake lights' blackout relay R401 are closed, thereby allowing the vehicle brake switch (not shown) to activate the rear window brake light (since pins 431 and 432 in the control bus bar 400A are connected), and further allowing the activation of the brake lights because pins 429 and 430 are connected. Further, pins 421 and 422 are normally connected through a switch of the interior dome (or courtesy) light's blackout relay R408 to allow the door switches to energize the interior dome or courtesy light 10. A taillight blackout relay R407 has normally closed switch connecting pins 425 and 426 which connect respective wires 12A and 12B (FIG. 3) to permit power from the vehicle wire to reach the taillight relay R407, thereby allowing the taillights' (12) wire to be activated by the running lights' switch. The DRL blackout relay R402 has one normally closed switch connecting pins 415 and 416 which connect wires 7A and 7B (FIG. 3) to allow power from the vehicle wire (7) to reach the DRL relay R402. Further, pins 423 and 424 are connected through a switch in the backup lights blackout relay R406, allowing activation of the backup lights (11). The low beam blackout relay R403 has a normally closed switch connecting pins 419 and 420 which connect wires 13A and 13B (FIG. 3) to permit power from the vehicle wire to reach the low beam relay R403, thereby allowing the low beam (13) wire to be activated by the headlight switch. Pin 411 also connects to pin 419 allowing power to pass through pin 319 to pin 113 (FIG. 3) of the switch panel 100A. A radio blackout relay R404 also has a normally closed switch connecting pins 433 and 434 which connect wires 5A and 5B (FIG. 3) to permit power from the vehicle wire (5) to reach the radio relay R404, thereby allowing the radio (5) wire to be activated by the running lights switch. Further, both of the normally closed switches of the dashboard dimmer and clock blackout relay R405 are closed, connecting pins 427 and 428 which connect wires 4A and 4B (FIG. 3) to allow power from the vehicle wire (4) to reach the relay R402. The other normally closed switch on blackout relay R405 is closed, connecting pins 417 and 418 which connect wires 8A and 8B (FIG. 3) to allow power from the vehicle wire (8) to also reach the relay R402. With the blackout control unit 400 attached to the wiring harness unit 300 as discussed above, the user can black out certain lighting features of the vehicle.

With the blackout override (dual latching) relay R409 contacts closed, in the reset position by the reset switch 21 (pin 107 to 307 FIG. 3 to pin 407 of connector 400A), the blackout switches of switch panel 100A will maintain power from the power supply fuse 352 to pin 301 on connector 300A (FIG. 3) through pin 401 of connector 400A, through the normally closed contacts of blackout override relay R409 to pin 406, to pin 306 and pin 106, and respectively connected to the blackout switches 22–26. At any time the reds switch 20 (Reds 1–3) is activated, power is supplied to pins 103, 104 and 105 connecting respectively to pins 403, 404 and 405 of connector unit 400A. From these pins power will pass through feedback diodes D407–D411, suppling power to the opposite coil of the blackout override relay R409, thus disabling power to all the blackout relays R401–R408 and reestablishing their respective pins or circuits.

As illustrated in FIGS. 1–4, if the user activates the brake lights blackout switch 22, the audio board 200A (when panel 100A is not used), the brake and interior window brake lights blackout relay R401, the backup lights blackout relay R406, and the interior dome light blackout relay R408 are activated. Power from pin 108 is supplied to pin 308 and pin 408 through the brake lights blackout relay R401 causing the normally closed switches to open. In this manner, the brake lights (2) and the interior window brake light (3) cannot come on. Simultaneously, power from R401 travels to the backup lights relay R406 disconnecting the backup lights by pins 423 and 424. Power is also sent through the feedback diode D402 to the interior dome light blackout relay R408, thereby disconnecting the interior dome lights (10) by pins 421 and 422.

Note when the highest level of red lighting on pin 405 (red 3) is energized, power will pass through diodes D409 and D404 to the interior dome light relay R408, thus disabling the dome lights by pins 421 and 422. When the optional switch S405 contacts are closed, power from Red 1 (pin 403) and Red 2 (pin 404) will be allowed to pass through diode D404, thus activating the dome light relay R408, disabling the dome lights (10).

When the taillight switch 23 is activated, power is supplied to the audio board 200A (when panel 100A is not used) and the dashboard dimmer and clock blackout relay R405, disconnecting the dashboard dimmer lights (4) by pins 427 and 428 and the digital clock lights (8) by pins 417 and 418; and simultaneously connecting pin 418 to pin 401 through the optional switch S401 and through resistor R42. When a separate digital clock is not available on the vehicle, opening the contacts on the switch S401 will allow the officer the option of using this relay for cutting out the lighting on a aftermarket switch panel. When switch S401 is used, this will direct power to the wire 8B of the clock's wire (8) digital display placing the display into the nighttime mode.

From the dashboard dimmer and clock blackout relay R405, the power from the taillight switch 23 passes to the radio relay R404 opening the normally closed contacts to disconnect the pins 433 and 434, and closing the normally open contacts connecting pin 433 to pin 401, thus directing power through resistor R41 to the radio display by line 5B and to the heater display by line 6B. Once power is supplied to wire 5B of radio's (5) digital display and wire 6B of the heater's (6) digital display, the respective displays are placed in their nighttime mode.

From the radio blackout relay R404, the power from the taillight switch 23 passes to the taillights relay R407 opening the normally closed contacts and disconnecting pins 425 and 426 of the tail lights' (12) wire. From the tail lights relay R407 energy is passed through feedback diode D403 through the closed contacts of switch S403 to the DRL relay R402 and opening the normally closed contacts, thereby disconnecting pins 415 and 416 of the DRL lights (7) wire.

Note that the DRL is controlled by the following three methods.

(1) For vehicles using auxiliary lighting (not headlamps) for daytime running lights. This method is disabled by the blackout taillights switch 23 described above with the contacts S402 and S404 open.

(2) For vehicles using headlights for daytime running lights. The blackout DRL switch 24 must be utilized to manually disable the headlights. This method is especially important for vehicles using fully automated DRL headlights. These systems will turn on the headlamps to full lighting intensity for nighttime operation without the operator turning on the dash headlamp switch. Using the automated blackout system to disable the headlamps at night while the vehicle is traveling could be dangerous. Using the blackout DRL switch will allow the officer to manually disable the headlamps when prepared to do so. When the officer is flashing the high beam headlights on Red 3, the headlight DRL is automatically disabled to improve the flashing effect of the headlights. This is accomplished by pin 405 (connected to the high beam headlight flashing on level three or Red 3), allowing power to pass through feedback diode D405 through the closed contacts of switch S404 (contacts S402, S403 open) to the DRL relay R402, and disconnecting pins 415 and 416.

(3) For vehicles not using DRL, the operator can use the DRL relay R402 to optionally disable additional exterior lighting such as one parking or running light to give the vehicle a different appearance during surveillance work. This is accomplished by allowing power to pass through the closed contacts of switch S402 (contacts S403, S404 open) through feedback diode D406 to the DRL relay R402, and disconnecting pins 415 and 416.

The blackout control system of the present invention is intended to be used in emergency vehicles, especially police squad cars, but can be adapted readily to snowmobiles, all terrain vehicles, ski jets, and the like. The blackout features render the police vehicle less visible to others outside the vehicle. These blackout features should be used only by trained professionals who possess the necessary skill and discretion to use these features safely.

Each switch of the illuminated switch panel A is illuminated when activated in order to indicate to the driver that the blackout feature provided by the switch is being used. If any of the red light switch 20 levels, i.e., Reds 1, 2 and 3, respectively, are turned on, power is provided to the relay coil of the override relay R409 connected to pins 401, and 406 as shown in FIG. 4. Once relay R409 is activated, the closed switches thereof open. Therefore, even if one or all of the emergency levels Reds 1–3 were activated, the blackout relays would be overridden, and the relays R401 through R408 would provide connections for allowing the lighting features of the car to operate normally as discussed above.

FIG. 5 illustrates the bypass plug-in unit 500A which is a bus bar designed to nullify the specific emergency light circuits and specific blackout light circuits installed by reconnecting the original vehicle circuits affected. This plug-in unit is used to replace blackout control unit 400 which is removed. This simple replacement can save the police department an expense in stripping the blackout control system installed by allowing the harness 300, for example, to be left in the vehicle for the resale of the vehicle. Bypass plug-in unit 500A will allow the vehicle to resume its original lighting condition before harness 300 was installed. Pins 515 and 516 are connected by a wire reestablishing connections at 7A and 7B of the DRL lights 7, thus returning the daytime running lights circuit to its original condition. This reconnection is performed with the clock 8 wire, the low beam light 13 wire, the dome lights 10 wire, the backup lights 11 wire, the taillights 12 wire, the dashboard dimmer 4 wire, the brake light 2 wire, the window brake wire 3, the radio 5 wire, and the heater 6 wire.

Figure 6A:
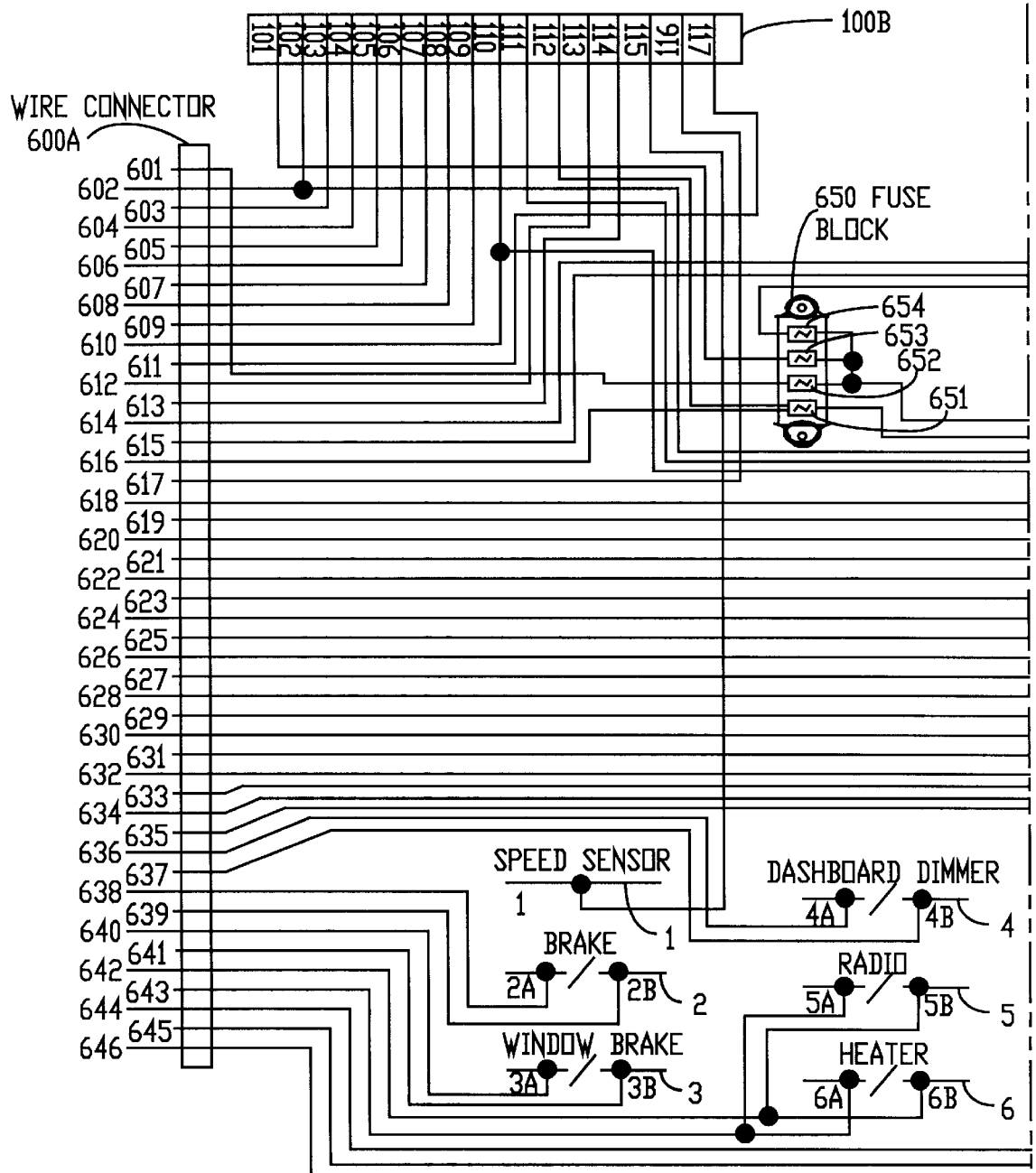
FIG. 6 is a wiring diagram for a second harness unit attachable to the blackout switch panel unit of FIG. 1 as part of a second embodiment of the present invention.
Figure 6B:
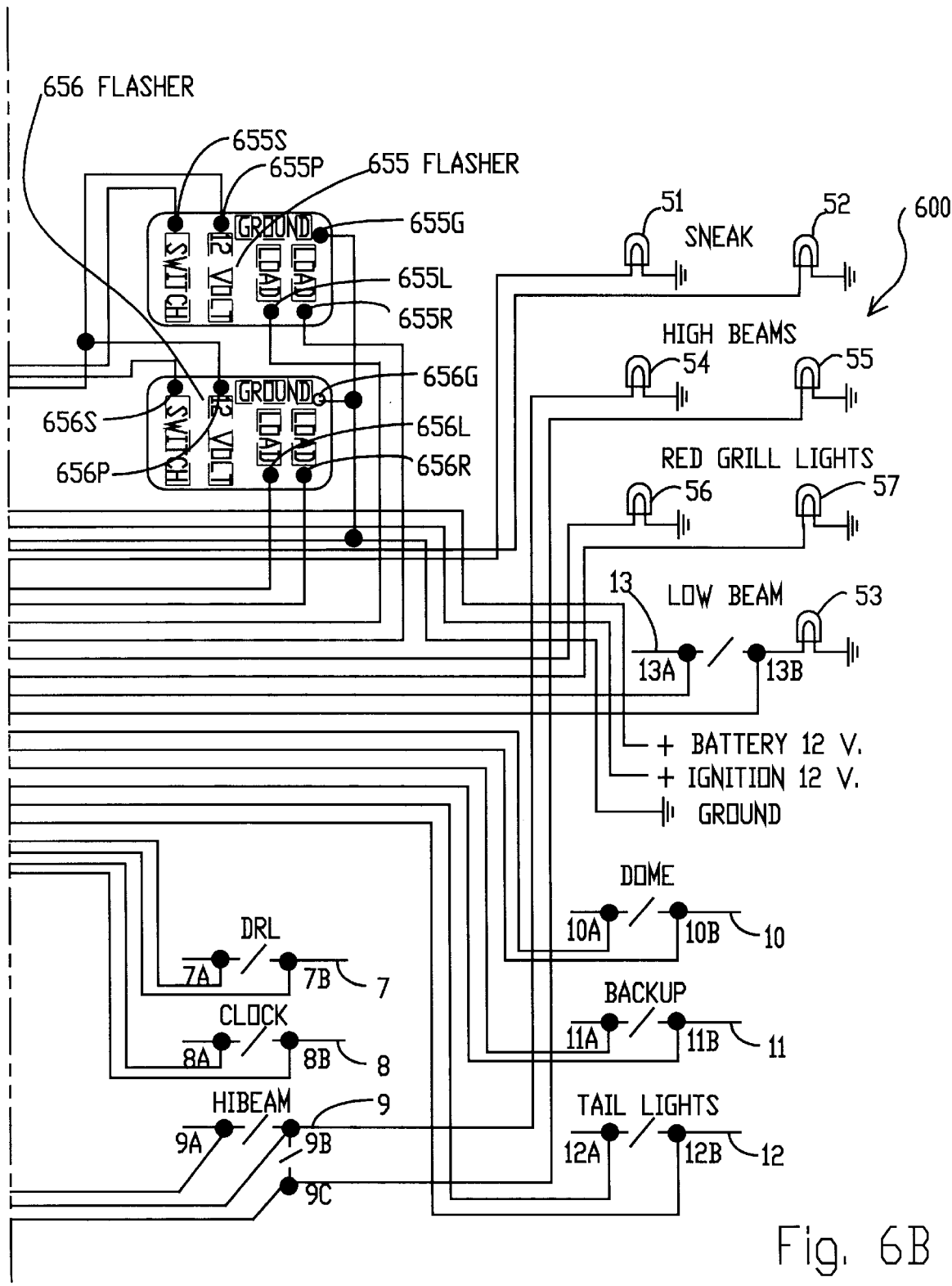

FIG. 6 illustrates the wiring harness 600 of the second embodiment for the blackout control system of the present invention. The wiring harness 600, like the wiring harness 300 of the first embodiment, is connected to wires 101 through 117 of the switch panel circuit 100A; however, the pin connections in the wire connector unit 600A are different. The wiring harness 600 has 46 pin connections numbered consecutively from 601 through 646. However, the second embodiment includes a flasher arrangement for the red grill lights and high beam lights, and a flasher arrangement for the backup lights and brake lights.

As shown in FIG. 6, the wiring harness 600 has a wire connector unit 600A attached at one end thereof, and is connected to the control unit 700 and the electrical lighting system of the vehicle at the other end. Like the wiring harness 300 of the first embodiment, the wiring harness unit 600 is connected to wires 101 through 117 of the blackout switch panel unit 100 of the vehicle. The vehicle wires are cut as described in the first embodiment above, and the cut wires are connected to their corresponding pins as follows: 2A and 2B (brake lights) to 638 and 639; 3A and 3B (rear window brake light) to 640 and 641; 4A and 4B (dashboard dimmer) to 636 and 637; 5A and 6A (display lights of the digital radio and heater, respectively) to 643; 5B and 6B to 642; 7A and 7B (DRL) to 632 and 633, respectively; 8A and 8B (clock) to 634 and 635; 9A, 9B and 9C (high beam lights) to 644, 645 and 646; 10A and 10B (interior dome light) to 626 and 624; 11A and 11B (backup lights) to 628 and 629; 12A and 12B (taillights) to 630 and 631; 13A (right low beam headlight) to 624; and 13B (right low beam headlight) to 625. Switch panel wire 115 is connected to the vehicle (speed sensor) 1 wire.

In the second embodiment of the wiring harness unit 600 shown in FIG. 6, the wire connecting the backup lights 11 is cut to produce wires 11A and 11B. Wire 11A goes to pin 628 and wire 11B is connected to pin 629. With the additional individual connections of the wiring harness 600 to the right and left backup lights 11 and the right and left brake lights 2, a flashing effect of the backup and brake lights is achieved. This is accomplished by using a conventional flasher unit 656. The flasher unit 656 for the vehicle rear lighting and the front flasher unit 655 each have two load outputs, one 12 volt input, a control ground and switch control input. Fuse 654 is used to power the flashers 655 and 656 by flasher wires 655P and 656P under the control of the illuminated switch panel A discussed below. The ground for the flasher control on flasher 655 and 656 is wire 655G and 656G.

Figure 7A:
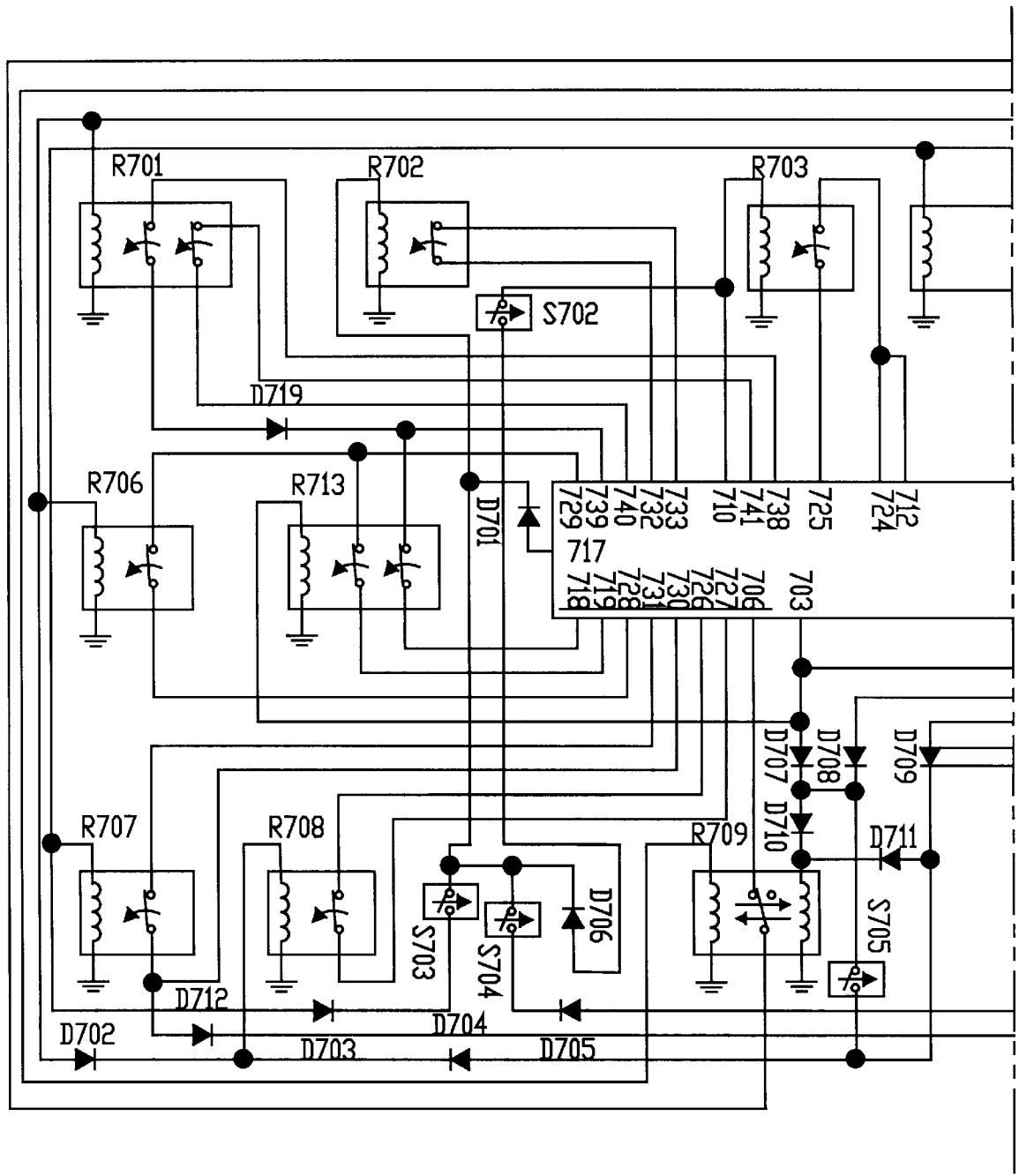
FIG. 7 is a wiring diagram for a second control unit attachable to the second harness unit of FIG. 6 as part of the second embodiment of the present invention.
Figure 7B:
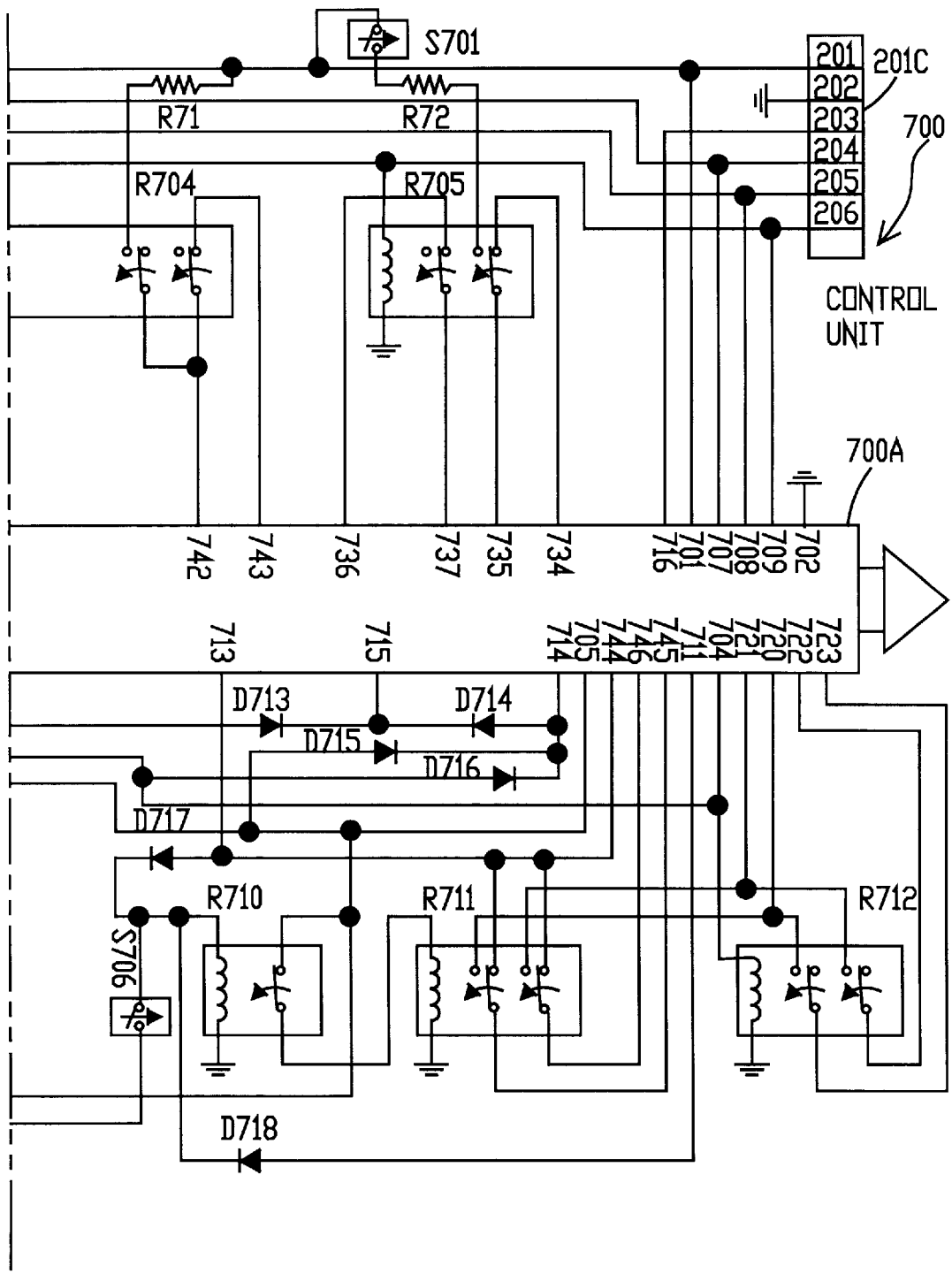

As shown in FIG. 7, the blackout control unit 700 has similar blackout features as blackout control unit 400. More specifically, When Red 1 of red switch 20 is activated, power is sent to pin 703 to the brake and backup lights' flasher relay R713, closing its contacts and connecting the brake and backup lights to the flasher 656 by pin connection 718 leading to the output 656L of the flasher 656 and pin connection 719 leading to the output 656R of the flasher 656. The control voltage from pin 703 also passes through diode D713 to pin 715 connecting to the flasher switch control 656S thereby activating the flasher.

Further, the brake and rear window brake light blackout relay R701 and the interior dome lights relay R708 and backup lights blackout relay R706 are used to black out the brake lights 2, rear window brake lights 3, the interior dome light 10, the backup lights 11, and power to the audio board 200A (when panel 100A is not used), upon the activation of the brake blackout switch 22 connected to pins 608 and 708. The power is transmitted to the relays R701, R708 and R706. Diode D719 is positioned in the line coming from pin 738 to pin 739 in order to prevent feedback from the rear flashing lights (brake) from affecting the vehicle's modular computer.

Power supplied to pin 709 activates the audio board 200A (when panel 100A is not used), and the relay R705 so as to interrupt the connection made between pins 736 and 737, which disconnects wire 4A supplying power from the dimmer switch to wire 4B leading to the dashboard dimmer and the digital clock lights (8) by pins 734 and 735; and simultaneously connecting pin 735 to pin 701 through the optional switch S701 and through resistor R72. When a separate digital clock is not available on the vehicle, opening the contacts on switch S701 will allow the officer the option of using this relay for cutting out the lighting on an aftermarket switch panel. When switch S701 is used, this will direct power to the wire 8B of the clock wire (8) digital display placing the display into the nighttime mode. The power from pin 701 leading to R704 diverts power through pin 742 to wires 5B and 6B (FIG. 6) to place the digital displays of the radio and heater control displays in their nighttime mode of operation as discussed with the other embodiments above. From the radio blackout relay R704, the power from the pin 709 passes to the taillights relay R707 disconnecting pins 730 and 731 of the taillights (12) wire. Note that the power from the vehicle taillights 12A is allowed to pass diode D712 to optional switch S706 and connecting the high beam flash override relay R710. When the officer uses a switch panel other than switch panel 100A, the officer can close the contacts on S706 to disable the high beam flash at nighttime (taillight power is connected to the vehicle headlight switch). This modification will apply for those states requiring no headlight flashing at night.

From the taillights relay R707, energy from pin 709 is passed through feedback diode D703 and through the closed contacts of switch S703 (option 1) to the DRL relay R702 disconnecting pins 732 and 733 of the DRL lights (7) wire. As stated in FIG. 4 the officer has the following three options dependent on the vehicle used.

(1) For vehicles using auxiliary lighting (not headlamps) for daytime running lights, use switch S703 on and switches S702 and S704 off.

(2) For vehicles using headlights for daytime running lights, the blackout DRL switch 24 must be used to manually disable the headlights with switch S704 on and switches S703 and S702 off.

(3) For vehicles not using DRL light (use as a spare), with relay R702 controlled by the low beam sneak switch 26, and with switch S702 on and switches S703 and S704 off. Note that blackout override relay R709, deactivates the blackout features of the blackout control unit 700 in the same manner as resistor R409 discussed above.

The front red grill lights and high beams flasher features of the blackout control unit 700 are controlled as follows. Relay R712 (Reds flasher relay) connects the red grill lights 56 and 57 to the flasher unit 655 when activated. It should be noted that the existing turn signal lights are substituted for the red grill lights for the smaller unmarked vehicles (not shown). Relay R711 connects the high beam headlights 54 and 55 to the flasher unit 655 when activated. The flasher 655 has one input for 12 volt power, two load outputs, one control ground, and one switch control wire. Flasher 655 is connected to the power from fuse 654 on fuse block 650 via input 655P. The flasher outputs 655L and 655R are connected to pins 720 and 721, respectively. As shown in FIG. 7, these pins lead to open connections to the various relays controlling the flashing features.

With the activation of levels 1–3 (Reds 1–3) on switch 20, power is supplied to pins 703, 704 and 705 of the control unit 700. This power also activates the relay coil of the blackout override relay R709 to deactivate the blackout features of the control unit 700 as discussed above. The brake and backup lights flasher 656 is activated through Reds 1, 2 and Red 3 by pins 703, 704 and 705, via diodes D713 to pin 715, diodes D716 and D714 to pin 715, and diodes D715 and D714 to pin 715. Note vehicles using a switch panel other than 100A switch panel will have the rear brake and backup lights flash on Red 2 or Red 3.

Furthermore, the high beam headlights flasher relay R711 is activated through the normally closed switch of the high beam headlights override relay R710 through pin 705. The red grill lights relay R712 is activated through pin 704. In this manner, the connection to the left high beam headlight 54 through pin 745 is changed to pin 720 leading to the output 655L as controlled by relay R711, while the connection to the right high beam headlight 55 through pin 746 is changed to pin 721 leading to output 655R.

Likewise, the outputs 655L and 655R are connected to pins 722 and 723, respectively, through the activation of the red grill lights relay R712. Pins 722 and 723 lead to the left grill light 56 and the right grill light 57, respectively. Thus, through the use of relays R711 and R712, a wigwag effect of the high beam headlights 54 and 55 along with the red grill lights 56 and 57 (or turn signal lights) is achieved by flashing the left high beam 54 and the right red grill light 57 on, with the right headlight 55 and the left red grill light 56 off, thus alternating the flashing lights.

Through the use of the control unit 700, the flash pattern is controlled to not bleed out the red grill lights when the high beams are flashing. When pin 703 is activated by the Red 1 switch (20) through pin 603, energy is sent to the coil in the brake and backup lights' flasher relay R713, and diodes D707 and D710 permits the energizing of one coil in the blackout override relay R709, thus disabling blackout relays R701–R708 with switch S705 open. When switch S705 is closed, power will pass through diode D704 to the blackout dome light relay R708, thus disconnecting the dome light the same way as described in FIG. 4.

When pin 704 is activated by the Red 2 switch (20) through pin 604, the coil in the brake and backup lights flasher relay R713 is energized along with diodes D708 and D710, permitting the energizing of one coil in blackout override relay R709, thus disabling blackout relays R701–R708 with switch S705 open. When S705 is closed, power will pass through diode D704 to the blackout dome light relay R708, thus disconnecting the dome light.

When Red 3 switch (20) is activated, energization on pin 705 will travel though the closed contacts on the high beam flash override relay R710 to the coil in the high beam flasher relay R711. In addition, power is passed through diodes D709 and D711 permitting the energizing of one coil in blackout override relay R709, thus disabling blackout relays R701–R708 with switch S705 open. Power from Red 3 is also sent to the diode D704 to the blackout dome light relay R708, disconnecting the dome lights.

The power to the blackout panel switches 22–26 via pin 706 from the blackout override relay R709 is routed by the activation of the reset switch 21 of panel 100 to the opposite coil of the blackout override relay R709, thus closing the contacts and connecting pins 701 and 706.

The high beam override relay R710 also overrides the high beam headlight flasher function upon activation of the high beam headlight switch supplying current to pin 744, which current passes through the diode D717 and energizes the coil of the high beam headlights' override relay R710. Further, the relay R710 may also be energized upon activation of the vehicle running lights' switch from pin 630 which supplies power to pin 730 upon activation of the running lights. Diode D712 prevents power from the high beam headlight switch from being channeled to the running lights, and diode D717 prevents power from the running lights' switch from reaching the output of the high beam headlights' switch. With the activation of relay R713, a flash pattern is activated with both brake lights on with both backup lights off, and then both backup lights on with both brake lights off. The relay R713 connects the backup lights to the output 656R by connecting pin 719 to pin 729. The relay R713 also connects the rear brake lights to the output 656L by connecting pin 718 to pin 739. In this manner, the backup lights are simultaneously on for half of the time, and the brake lights are simultaneously on for the other half of the time. This produces the flashing effect for the brake lights and backup lights.

In FIG. 8 the bypass plug-in unit 800A connects to bypass the control unit 700 of FIG. 7, thus restoring the vehicle to its original lighting condition. These bypass plug-in units 500A and 800A can be attached to their respective blackout harness units 300 and 600. The pertinent connections for each bypass plug unit are labeled. This feature will allow the officer to bypass the blackout control units for servicing of the emergency lighting system in a modified vehicle and/or return the vehicle back to its original lighting condition. The use of these bypass plug-in units can save the police department in expensive stripping costs for resale.

The blackout control panel system can be advantageously combined with a siren control head, i.e., using the siren with the present blackout lighting.

It is to be understood that the present invention is not limited to the embodiments described above, but encompasses any and all embodiments within the scope of the following claims.

I claim:

1. An improved blackout control system for use in an emergency vehicle having emergency lights including, high and low beam headlights, running lights, front lights selected from red grill lights and turn signal lights, a rear window brake light, brake lights, and backup lights controlled by a backup switch for supplying power to backup lights of the vehicle when the vehicle is placed in reverse, a manually activated running light switch to provide power to running lights of the vehicle, an interior dome light activated by opening doors, and a brake switch for supplying power to brake lights of the vehicle when a brake pedal within the vehicle is engaged, a vehicle speed sensor used to supply vehicle computer speed information, said improved blackout control system containing a blackout panel unit, a harness unit and a control unit comprising:

(a) a blackout panel unit in an emergency vehicle comprising:

a first manually activated emergency light switch supplying power to brake and backup lights;

a second manually activated emergency light switch supplying power to red grill lights;

a third manually activated emergency light switch supplying power to high beam headlights of the vehicle;

a first manually activated blackout switch to reset power to the blackout switches;

a second manually activated blackout switch to deactivate the brake lights;

a third manually activated tail lights' blackout switch to deactivate the running lights;

a fourth manually activated blackout switch to deactivate the daytime running lights;

a fifth manually operated blackout sneak light switch to activate a high beam sneak light;

a sixth manually operated blackout sneak light switch to activate a low beam sneak light; and a reset means;

(b) a harness unit connected to all the switches in said blackout panel of the emergency vehicle;

(c) a control unit connected to said harness unit and to the lighting system of the emergency vehicle; and (d) a microprocessor;

wherein when any of the first, second and third emergency light switches is selected, power to the blackout switches for the brake and backup lights, running lights, interior dome light, digital radio display light, digital heater display light, digital clock display light, low beam headlights, and the sneak lights is simultaneously interrupted and stay off until the power is restored by a reset means in cooperation with the microprocessor with the exception of the first emergency light switch deactivating the interior dome light.

2. The blackout control system according to claim 1, wherein said blackout panel is illuminated by separate panel lights and each panel switch comprises a switch with a light emitting diode illuminated upon activation.

3. The blackout control system according to claim 1, wherein the vehicle also includes an ignition switch, a headlight switch, a digital radio display, a digital heater control display, and a digital clock display, said digital displays operable in a daytime mode in which said digital displays thereof are fully illuminated upon activation of said ignition switch, and a nighttime mode in which said digital displays are partially illuminated upon activation of said running lights' switch, said taillights blackout means, including means for placing said digital displays of said radio, and heater and clock control displays in said nighttime mode of operation, and said tail lights' blackout including microprocessor control means for eliminating illumination of said digital displays of said radio, heater and clock control displays.

4. The blackout control system according to claim 1, wherein said emergency vehicle further includes a high beam headlight switch to activate right and left high beam headlights, said emergency lights including right and left side emergency red grill lights located proximate to the grill of the vehicle and between said high beam headlights, and front wigwag flasher means activated upon the activation of said manually activated emergency light switch for alternately flashing the right high beam headlight in unison with the left side red grill light and the left high beam headlight in unison with the right side red grill light for a controlled flash pattern by the microprocessor.

5. The blackout control system according to claim 4, further including a high beam headlight override means for deactivating said front wigwag flasher means in response to the activation of said high beam headlight switch.

6. The blackout control system according to claim 4, further including a high beam headlight override means for deactivating said front wigwag flasher means in response to nighttime operation by activation by a light response means selected from a phototransistor and a photocell to trigger a microprocessor signal.

7. The blackout control system according to claim 4, further including a manually activated front headlight flasher override switch for deactivating said front headlight flasher means upon activation of the running lights' switch.

8. The blackout control system according to claim 4, further including a manually activated frond headlight flasher override switch for deactivating said front headlight flasher means upon activation by a photosensitive means selected from a phototransistor and a photocell by the microprocessor.

9. The blackout control system according to claim 1, wherein activation of the first emergency light level alternately flashes said brake lights with said backup lights and deactivates the interior dome light.

10. The blackout control system according to claim 1, wherein the first emergency light switch activates the first, second and third emergency lighting levels, whereby all emergency lights are activated for a pursuit.

11. The blackout control system according to claim 1, wherein the second emergency light level activates the flashing of the lights selected from red grill lights and the turn signal lights with the brake lights and backup lights, and inactivates the interior dome light.

12. The blackout control system according to claim 1, wherein the third emergency light level activates the flashing of the headlights with front lights selected from the red grill lights, turn signal lights, backup lights, and brake lights, wherein the rear brake lights alternate flashing with the backup lights, and the interior dome light being deactivated.

13. The blackout control system according to claim 1, wherein the first reset switch additionally deactivates the brake, tail, daytime running lights, high beam sneak light and low beam sneak light switches.

14. The blackout control system according to claim 1, wherein the second blackout light switch additionally deactivates the brake lights, the backup lights and the interior dome light.

15. The blackout control system according to claim 1, wherein the third blackout light switch additionally deactivates the lighting of the running lights, the auxiliary daytime running lights, the digital radio display, the digital heater display and the digital clock display.

16. The blackout control system according to claim 1, wherein the fourth blackout light switch additionally deactivates the headlight daytime running lights.

17. The blackout control system according to claim 1, wherein the fifth blackout light switch additionally activates a high beam sneak light at high illumination.

18. The blackout control system according to claim 1, wherein the sixth blackout light switch additionally activates a low beam sneak light at low illumination.

19. The blackout control system according to claim 1, wherein the blackout switch panel unit being combined with a siren control head.

20. The blackout control system according to claim 1, wherein a bypass plug-in circuit unit being inserted onto said harness unit to replace said control unit to return the vehicle to its original lighting condition.

21. The blackout control system according to claim 1, wherein as a safety feature, the blackout switch LEDs return to full illumination in response to a photosensitive means selected from a photocell and a phototransistor sensing daylight.

22. The blackout control system according to claim 1, wherein the illumination of the blackout switch LEDs being lowered to minimize glare while the user drives in a blackout phase.

23. The blackout control system according to claim 1, wherein as a safety feature, the blackout panel illumination being disabled in response to a photosensitive means selected from a photocell and a phototransistor after the photosensitive means senses nighttime in the blackout phase.

24. The blackout control system according to claim 1, wherein the interior dome light being prevented from illuminating when any of the first, second and third emergency light switches are engaged.

25. The blackout control system according to claim 1, wherein a daytime running lights blackout means being provided to selectively deactivate the headlights in the daytime and in the nighttime mode.

26. The blackout control system according to claim 1, wherein a blackout audio warning means being provided to alert the operator of blackout switch operation in the daytime or in the nighttime mode.

27. The blackout control system according to claim 1, wherein a blackout speed control warning being given to the operator by audio warning and visual indicator means to alert the operator of exceeding a preselected blackout speed.

28. The blackout control system according to claim 1, wherein the headlight flash being improved by disabling the daytime running lights switch.

29. The blackout control system according to claim 1, wherein the high beam sneak light being automatically energized when the low beam sneak light becomes defective.

* * * * *